United States Patent
Hasegawa et al.

(10) Patent No.: US 8,483,531 B2
(45) Date of Patent: Jul. 9, 2013

(54) OPTICAL FIBER

(75) Inventors: Takemi Hasegawa, Yokohama (JP);
Tetsuya Hayashi, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 284 days.

(21) Appl. No.: 12/920,012

(22) PCT Filed: Feb. 25, 2009

(86) PCT No.: PCT/JP2009/053417
§ 371 (c)(1),
(2), (4) Date: Aug. 27, 2010

(87) PCT Pub. No.: WO2009/107667
PCT Pub. Date: Sep. 3, 2009

(65) Prior Publication Data
US 2011/0002580 A1    Jan. 6, 2011

(30) Foreign Application Priority Data

Feb. 28, 2008  (JP) .................. P2008-048498
Sep. 4, 2008   (JP) .................. P2008-227190

(51) Int. Cl.
*G02B 6/02* (2006.01)
(52) U.S. Cl.
USPC ........................................... 385/123
(58) Field of Classification Search
None
See application file for complete search history.

(56) References Cited

U.S. PATENT DOCUMENTS

| 5,701,376 A | 12/1997 | Shirasaki |
| 5,822,487 A | 10/1998 | Evans et al. |
| 6,993,229 B2 | 1/2006 | Chen et al. |
| 2003/0010066 A1 | 1/2003 | Sasaoka et al. |

(Continued)

FOREIGN PATENT DOCUMENTS

| CN | 1472153 A | 2/2004 |
| JP | 07-168070 | 7/1995 |

(Continued)

OTHER PUBLICATIONS

Li, M.J., et al., "Effects of lateral load and external twist on polarization-mode dispersion of spun and unspun fibers", Optics Letters, Oct. 1, 1999, pp. 1325-1327, vol. 24 No. 19, Optical Society of America.

(Continued)

*Primary Examiner* — Tina Wong
(74) *Attorney, Agent, or Firm* — McDermott Will & Emery LLP

(57) ABSTRACT

The present invention relates to an optical fiber, wherein PMD will not significantly increase even when an external factor, such as a lateral pressure, a bending and the like, is applied to the optical fiber. The optical fiber is imparted with a twist that is an elastic torsion with stress. In the condition that a twist rate, being the number of rotations per unit length by the twist, is represented by f(z) as a function of a position z in a longitudinal direction of the optical fiber, which has a predetermined twist cycle and is defined such that, in one twist cycle, a twist rotation angle in one direction and a twist rotation angle in the opposite direction are equal to each other, when a proportionality coefficient representing circular birefringence per twist rate is denoted by g, an angular frequency is denoted by $\omega$, and external linear birefringence due to a bending and a lateral pressure is denoted by $\beta_e$, then an average twist cycle L and an average twist rate $\gamma_{av}$ in the optical fiber satisfy predetermined relational expressions.

7 Claims, 35 Drawing Sheets

U.S. PATENT DOCUMENTS

| | | | |
|---|---|---|---|
| 2004/0017986 A1* | 1/2004 | Garner et al. | 385/123 |
| 2004/0232571 A1 | 11/2004 | Tong et al. | |
| 2006/0133751 A1 | 6/2006 | Chen et al. | |
| 2006/0147166 A1 | 7/2006 | Roba et al. | |

FOREIGN PATENT DOCUMENTS

| | | |
|---|---|---|
| JP | 08-050208 | 2/1996 |
| JP | 3226283 | 8/2001 |
| JP | 2004-161572 A | 6/2004 |
| WO | WO 97/26221 | 7/1997 |
| WO | WO-2005/100274 A1 | 10/2005 |
| WO | WO-2006/107353 A2 | 10/2006 |

OTHER PUBLICATIONS

Poole, C.D., et al., "Dynamical equation for polarization dispersion", Optics Letters, Mar. 15, 1991, pp. 372-374, vol. 16 No. 6, Optical Society of America.

Noda, J., et al., "Polarization-Maintaining Fibers and Their Applications", Journal of Lightwave Technology, Aug. 1986, vol. LT-4 No. 8, IEEE.

Schuh, R.E., et al., "Theoretical analysis and measurement of effects of fibre twist on polarization mode dispersion of optical fibres", Electronics Letters, Sep. 28, 1995, pp. 1772-1773, vol. 31 No. 20.

Chinese Office Action, with English Translation, issued in Chinese Patent Application No. CN 200980107118.1, dated Jan. 4, 2012.

Chinese Office Action, and English translation thereof, issued in Chinese Patent Application No. 200980107118.1 dated Aug. 9, 2012.

Japanese Office Action with English Translation issued in Japanese Application No. 2010-500721 mailed Dec. 4, 2013.

Extended European Search Report issued in European Patent Application No. 09715475.1 dated Jan. 22, 2013.

* cited by examiner

Fig.2
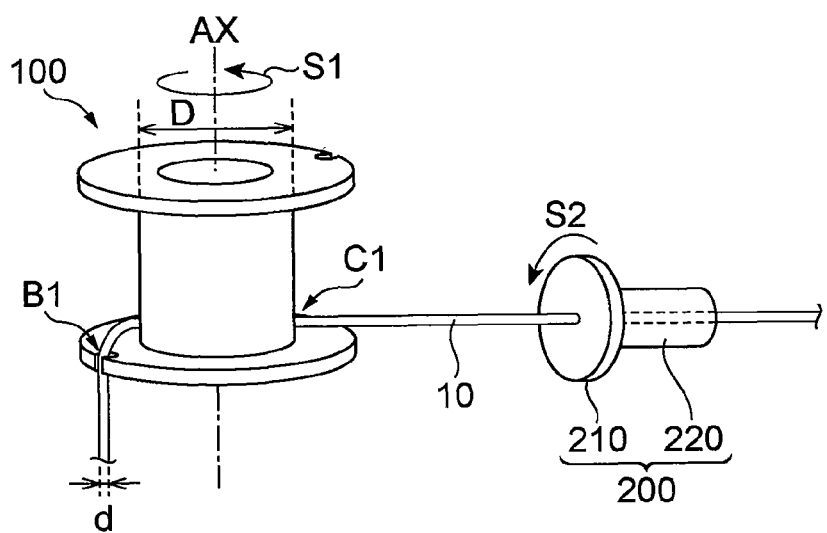
(a)
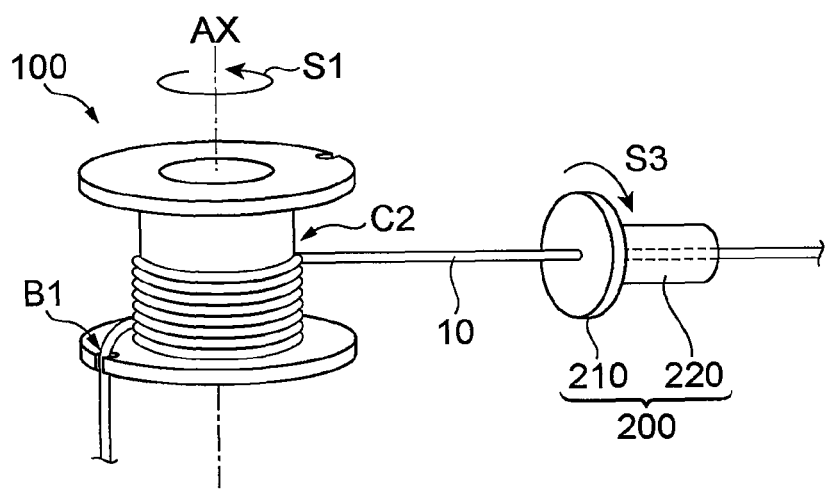
(b)
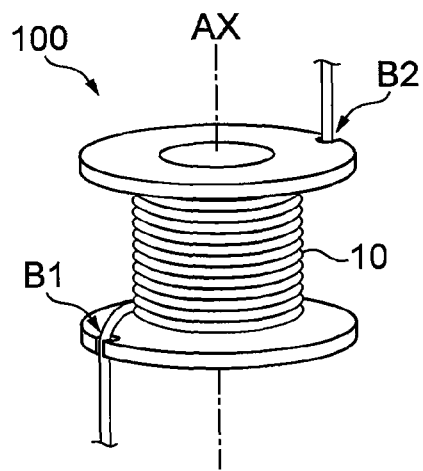
(c)

UPPER LIMIT OF ERROR A FROM
OPTIMUM NUMBER OF TWIST ROTATIONS [times]

Fig. 20
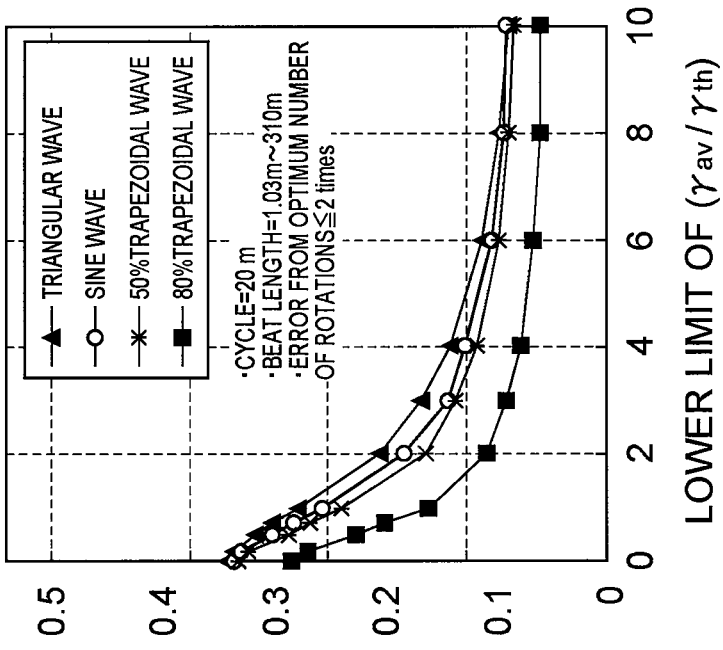
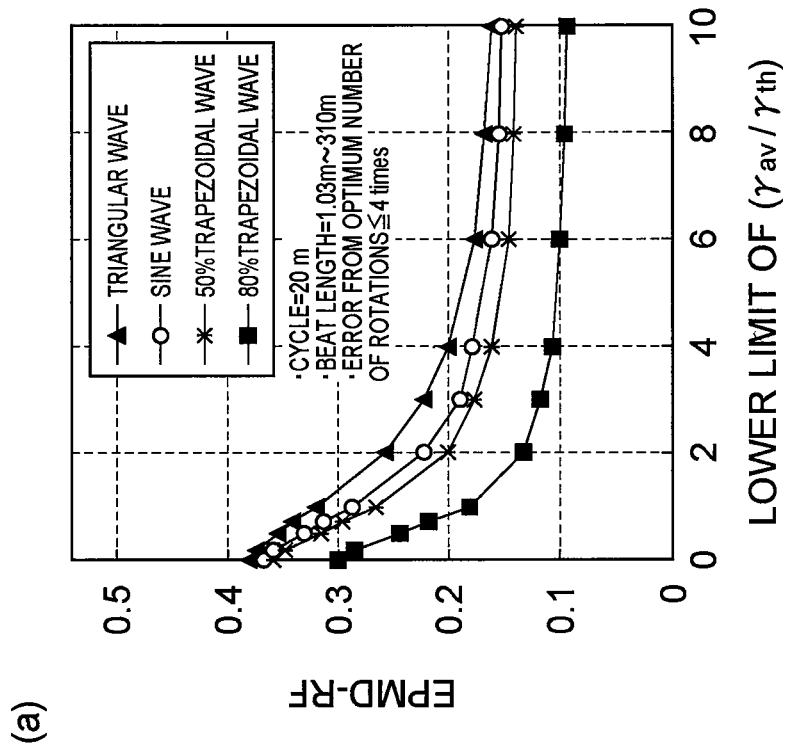

*Fig.23*
(a)
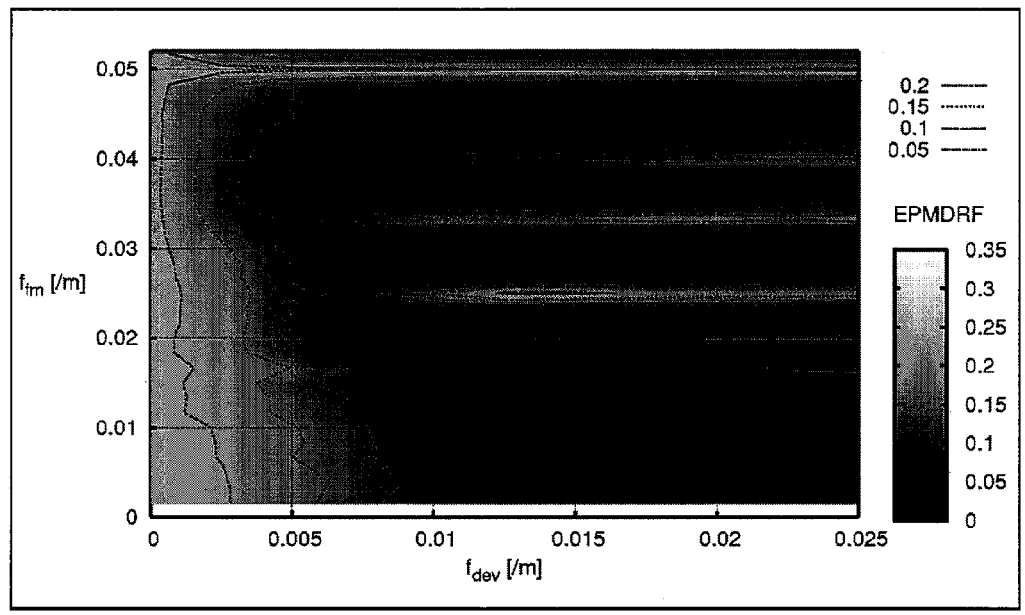
(b)
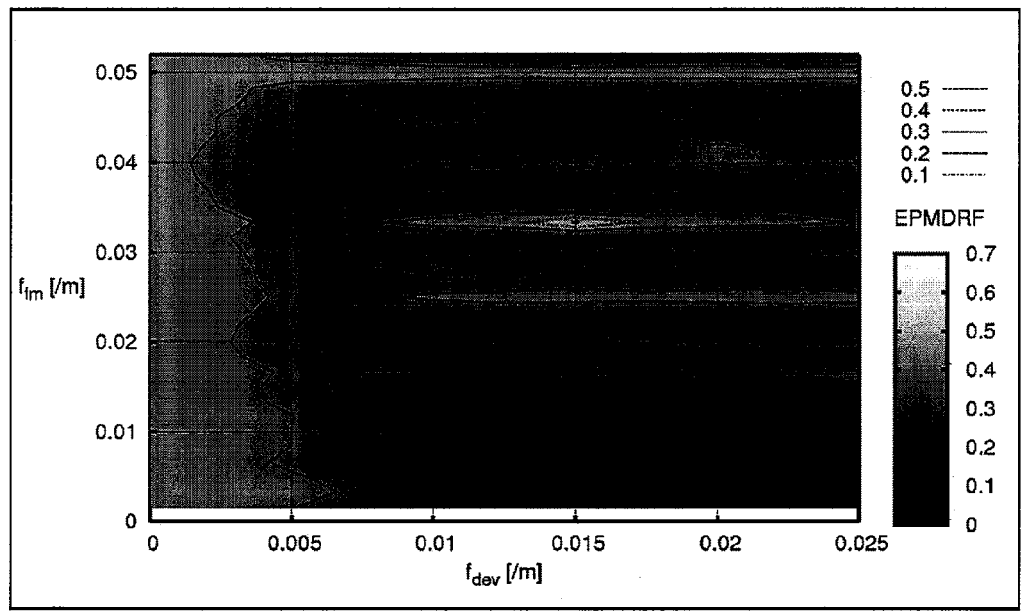

Fig.24
(a)
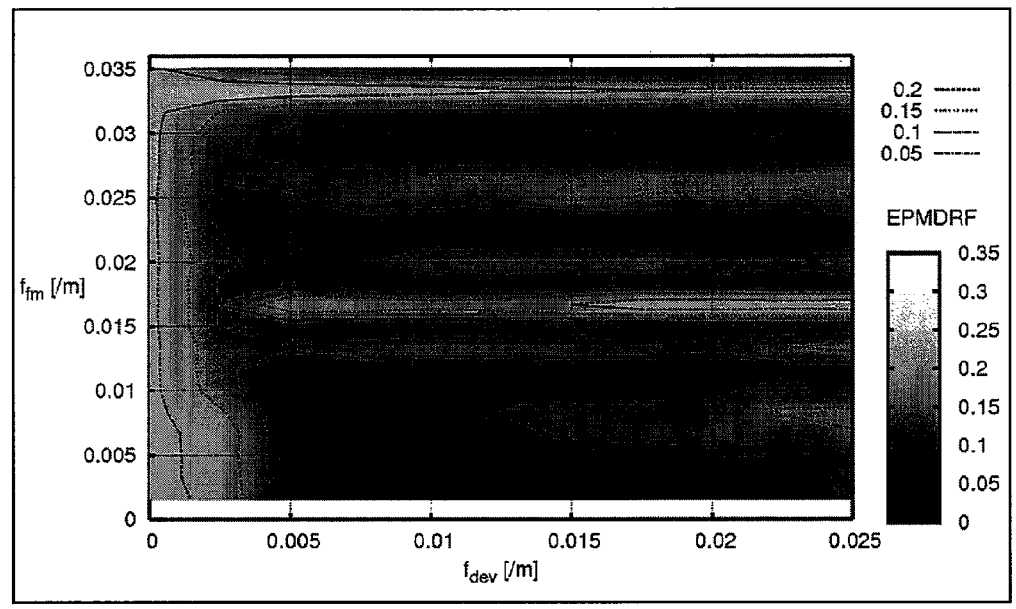
(b)
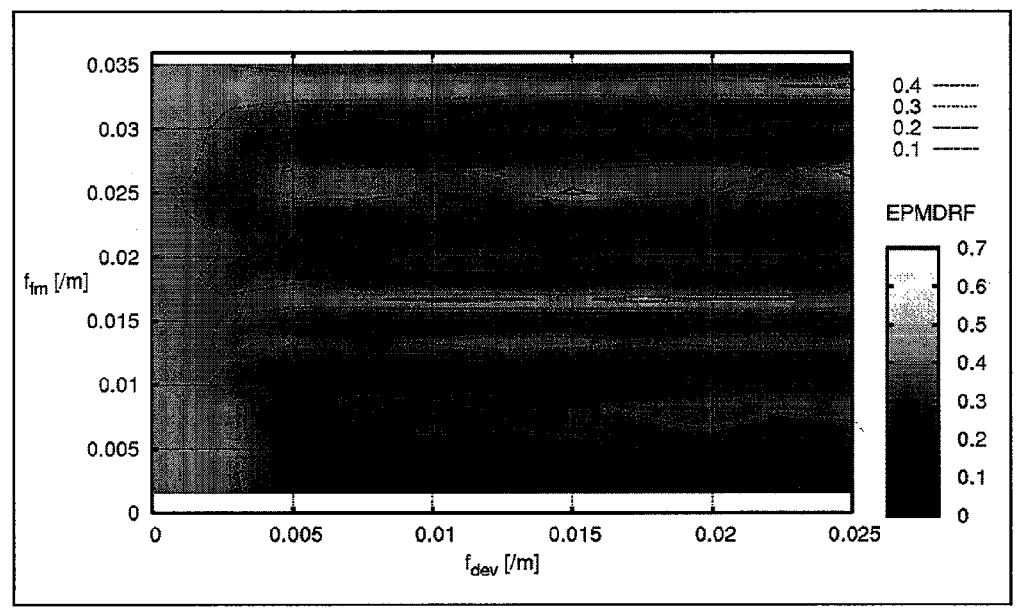

*Fig.25*
(a)
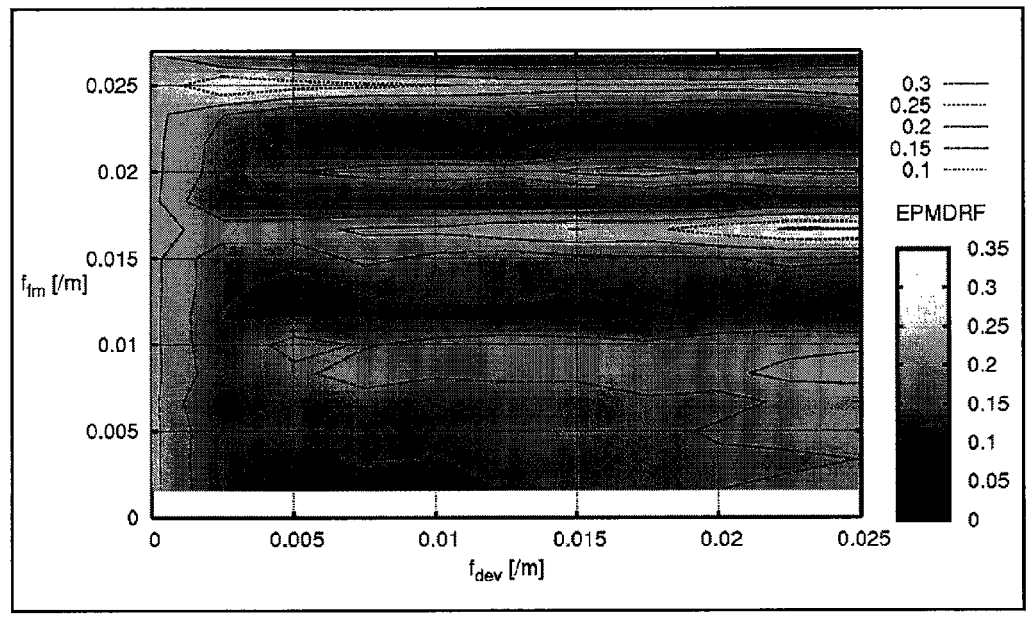
(b)
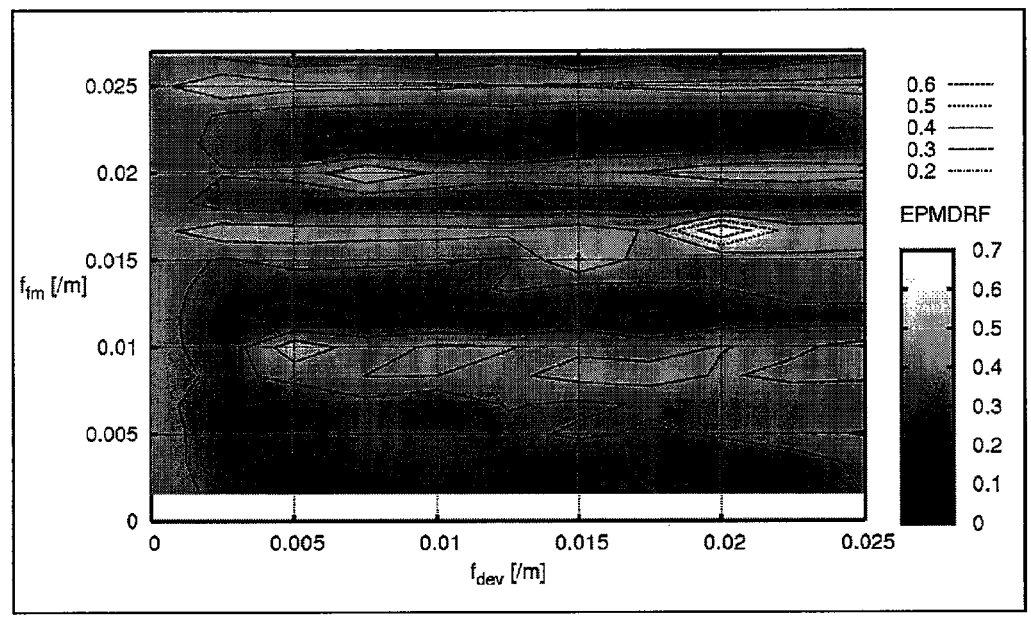

*Fig.29*
(a)
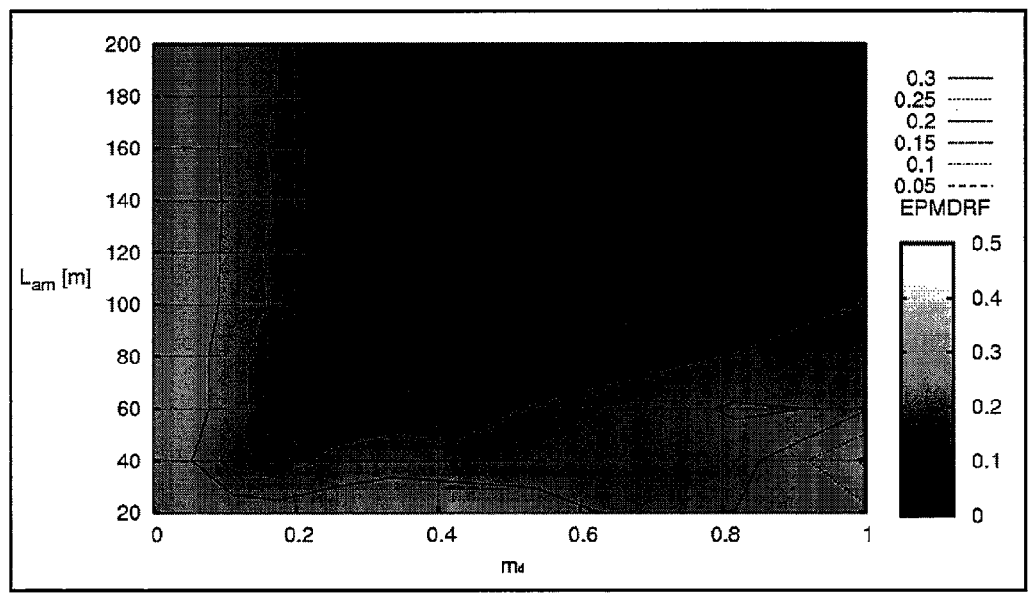
(b)
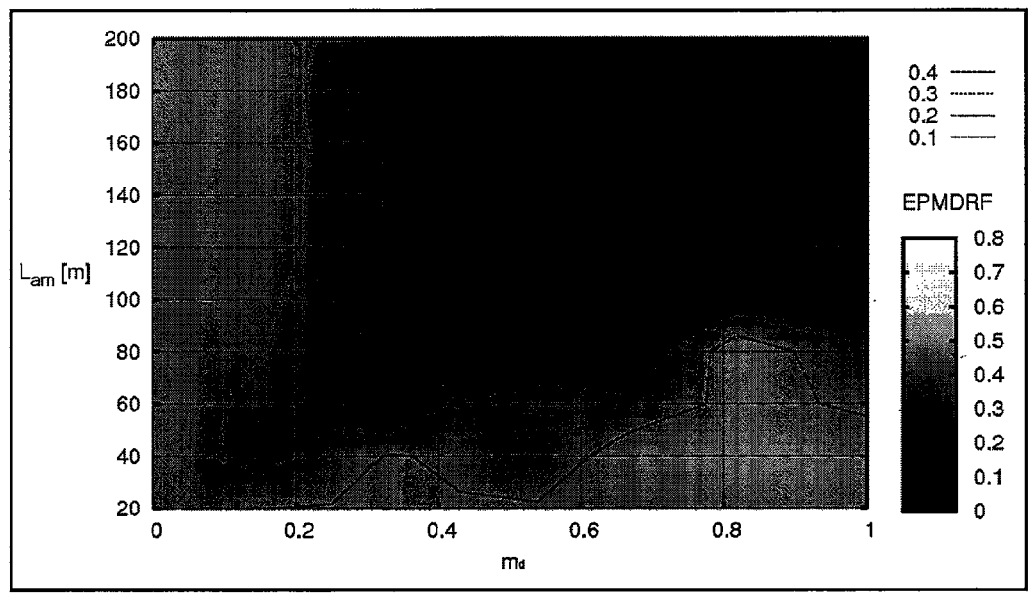

*Fig.30*
(a)
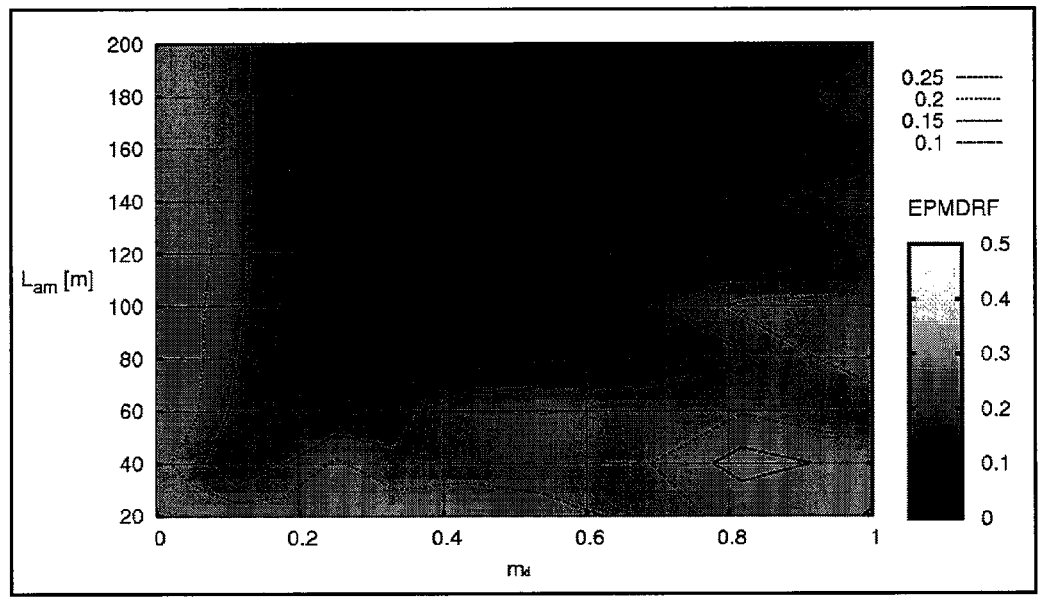
(b)
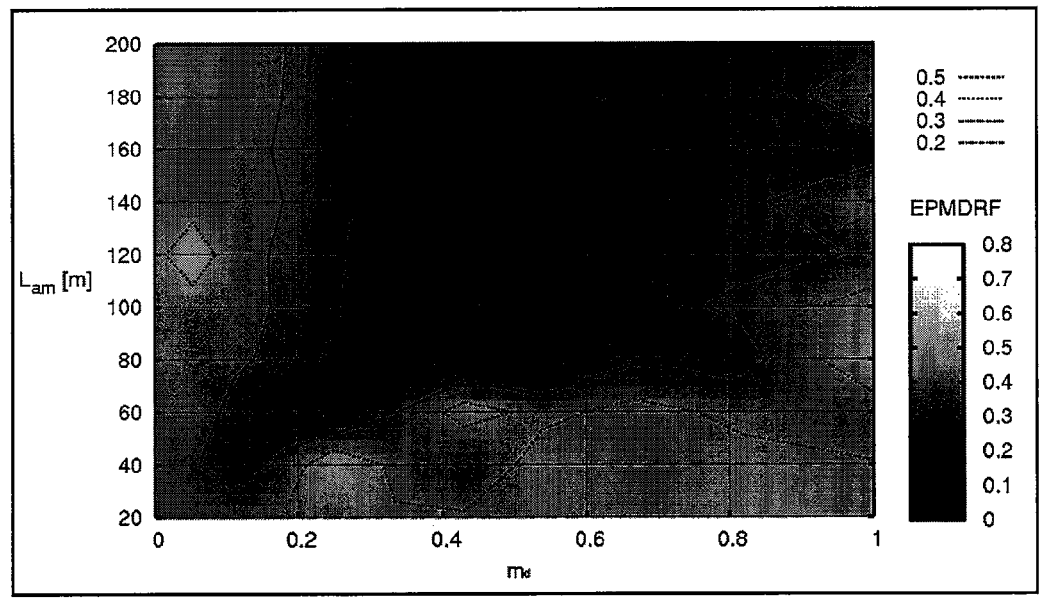

*Fig.31*
(a)
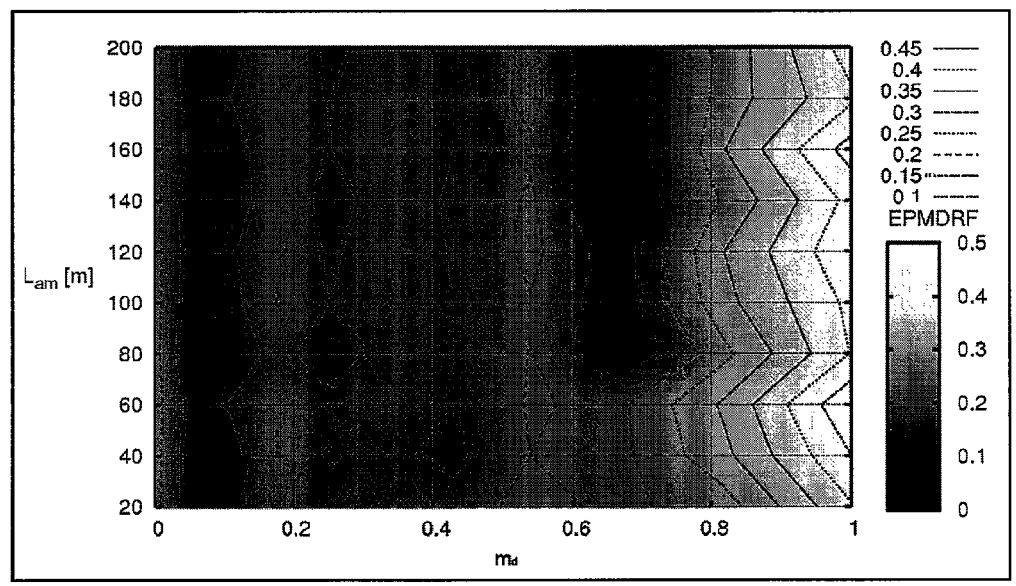
(b)
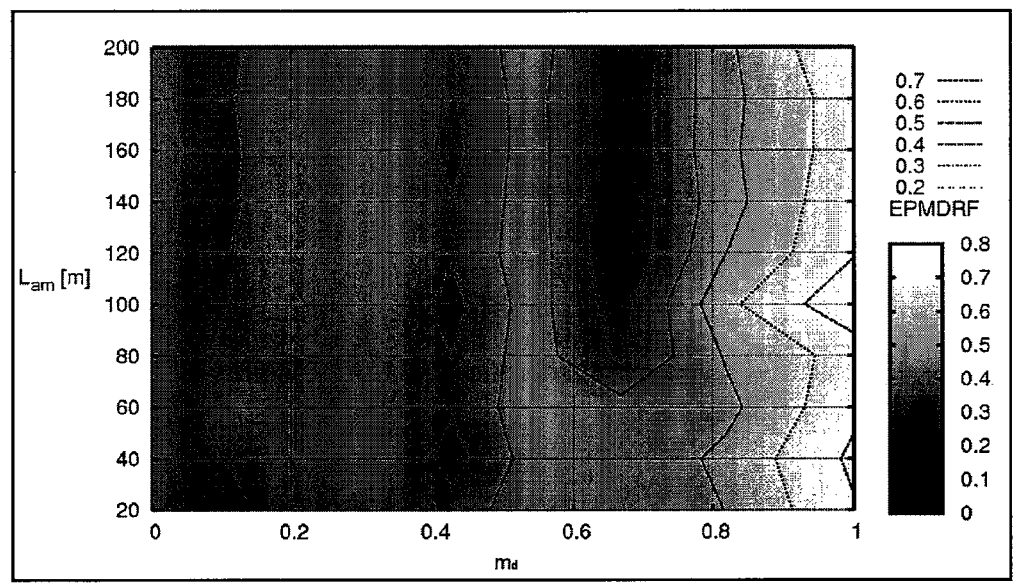

Fig.34
(a)
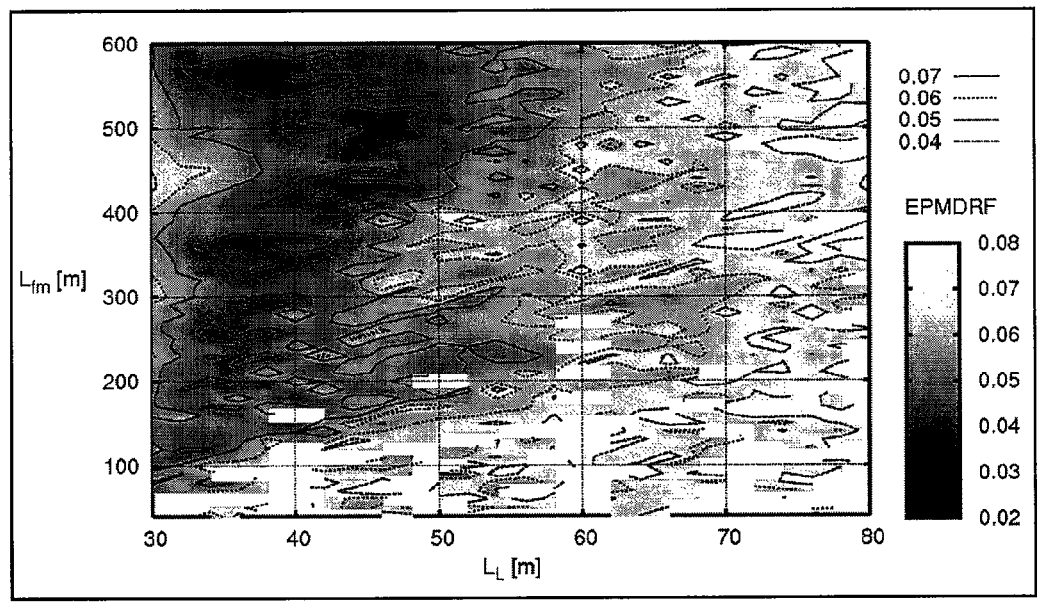
(b)
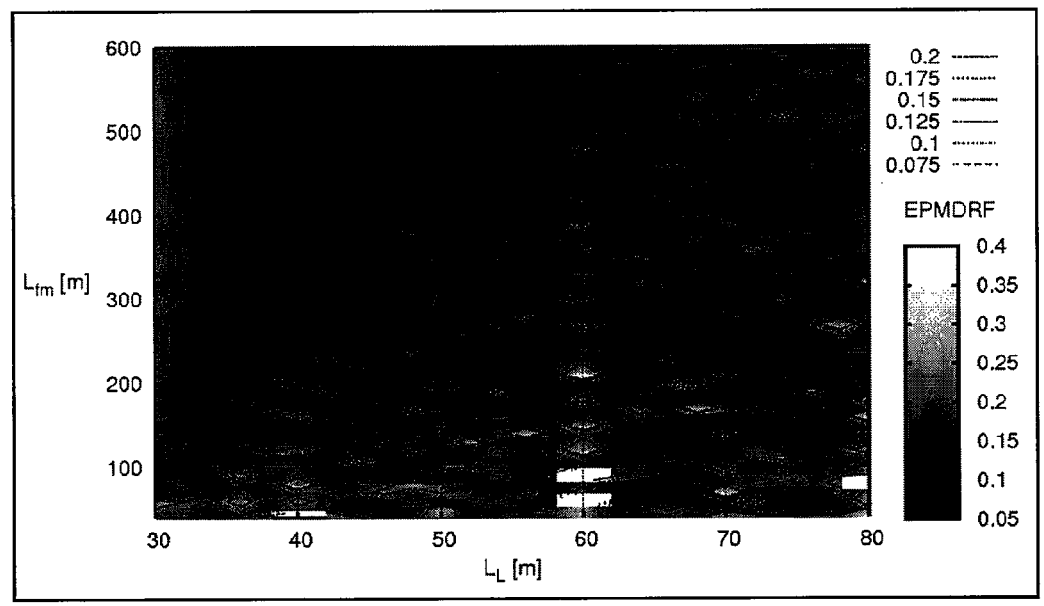

Fig.35
(a)
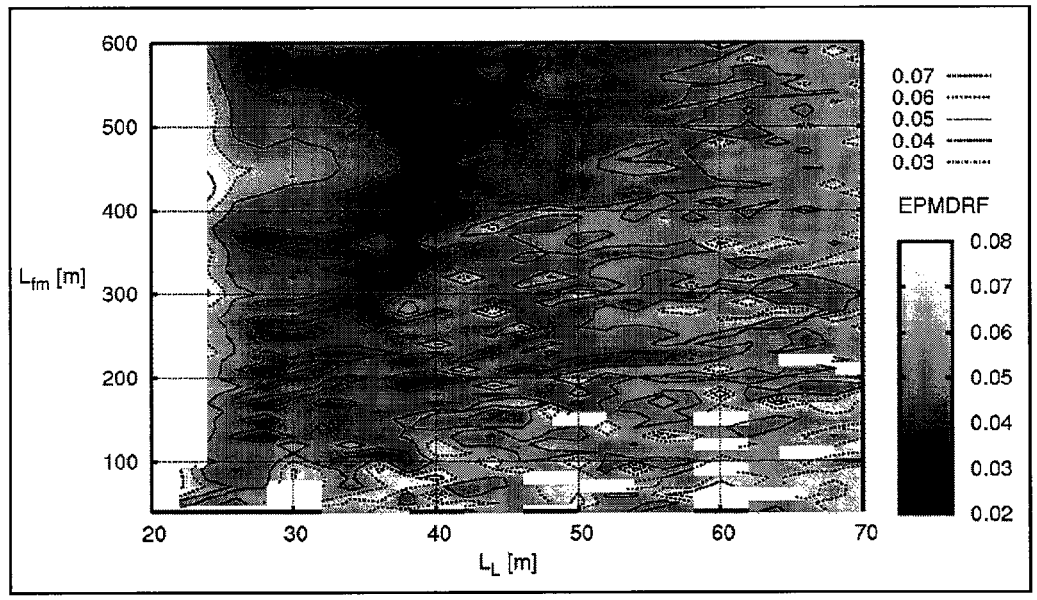
(b)
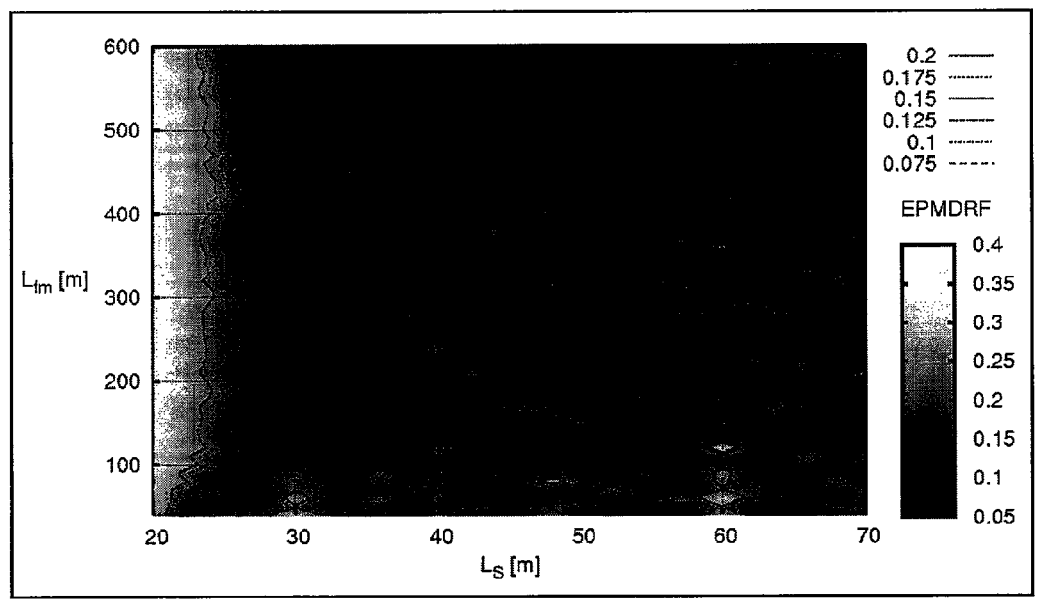

OPTICAL FIBER

RELATED APPLICATIONS

This application is the U.S. National Phase under 35 U.S.C. §371 of International Application No. PCT/JP2009/053417, filed on Feb. 25, 2009, which in turn claims the benefit of Japanese Application No. 2008-048498, filed on Feb. 28, 2008 and Japanese Application No. 2008-227190, filed on Sep. 4, 2008, the disclosures of which Applications are incorporated by reference herein.

TECHNICAL FIELD

The present invention relates to an optical fiber.

BACKGROUND ART

Polarization mode dispersion (PMD) of an optical fiber is a difference in the group delay between two basic waveguide modes of the optical fiber. The PMD occurs due to anisotropy of the optical properties of an optical fiber. The causes of the anisotropy of optical properties include external factors such as a lateral pressure, a bending, or a twist of an optical fiber other than internal factors, such as the structure or composition of an optical fiber, or the anisotropy of internal stress. Since the PMD is a factor that limits the transmission capacity of an optical fiber, various technologies for reducing the PMD of an optical fiber have been developed.

Patent Document 1 discloses a method, in which the PMD of an optical fiber is reduced by imparting a twist to the optical fiber. In this method, in the step of drawing an optical fiber from a glass preform, a device for twisting the optical fiber is disposed between a device for pulling the optical fiber and a device for winding up the optical fiber onto a reel, thereby imparting a twist to the optical fiber and winding up this twisted optical fiber onto the reel. Alternatively, in the step of rewinding an optical fiber, which is wound on a reel, onto a different reel, a twist is imparted to the optical fiber by winding up the optical fiber while twisting the same. By imparting an appropriate magnitude of twist to an optical fiber, the PMD of the optical fiber can be reduced. For example, it is shown here that the PMD can be reduced to one-fifth or less in any optical fiber having a beat length in a range of 5 to 50 m by imparting a twist of at least once/m to the optical fiber.

Note that, in Patent Document 1, a torsion with stress is defined as a twist and a torsion without stress is defined as a spin. The same definitions as these are also used in this specification.

Patent Document 2 discloses a method imparting, in the step of drawing an optical fiber from a glass preform, a spin to the optical fiber by drawing an optical fiber from the preform while twisting the same. According to this document, the PMD may be reduced particularly well when a spin, whose polarity is reversed at a cycle varying at 1 m or more and in the longitudinal direction, is imparted to an optical fiber having a beat length longer than 0.5 m.

In Non-Patent Document 1, the behavior of PMD due to external factors in an optical fiber imparted with a spin is described. According to this document, in an optical fiber without spin, the PMD differs depending on the direction of a lateral pressure, while in the optical fiber with a spin, the PMD is averaged with respect to the direction and thus no longer depends on the direction of a lateral pressure, but as the lateral pressure increases, the PMD may similarly increase with or without spin.

Patent Document 1: US Patent Application Publication No. 2006/0133751
Patent Document 2: U.S. Pat. No. 6,993,229
Non-Patent Document 1: M. J. Li et al., Optics Letters, vol. 24, no. 19, pp. 1325-1327 (1999)
Non-Patent Document 2: C. D. Poole, et al., Optics Letters vol. 16, pp. 372-374 (1991)
Non-Patent document 3: J. Noda et al., J. Lightwave Technol. v. 4, pp. 1071-1089 (1986)
Non-Patent document 4: R. E. Shuh et al., Electronics Letters, vol. 31, no. 20, pp. 1772-1773, (1995)

DISCLOSURE OF THE INVENTION

Problems that the Invention is to Solve

The inventors have studied the foregoing prior art in detail, and as a result, have found problems as follows. Namely, in the prior arts, although the PMD due to internal factors can be reduced well, the PMD due to external factors cannot be reduced well. Two reasons for this may be considered as follows.

The first reason is that in many prior arts disclosed in Patent Document 2 and the like, a spin is used as a means for reducing PMD. In an optical fiber imparted with a spin, waveguide light of the basic mode propagates without significantly changing its polarization state. Therefore, when birefringence in a fixed direction occurs due to a lateral pressure or a bending, a difference in the group delay between two basic modes will accumulate rapidly and cause a large PMD. In order to reduce the PMD due to external factors, the waveguide light of the basic mode needs to propagate while changing its polarization state. For this purpose, it is preferable to impart a twist, not a spin.

The second reason is that in Patent Document 1 the method of imparting a twist is not appropriate. Just imparting a twist cannot reduce the PMD due to external factors. In order to reduce the PMD due to external factors, the amount and reversing cycle of a twist need to be designed appropriately. In the first place, the technology disclosed in Patent Document 1 is intended to reduce the PMD due to internal factors but not intended to reduce the PMD due to external factors.

The present invention has been made in order to solve the problem as described above. It is thus an object of the present invention to provide an optical fiber whose PMD will not significantly increase even when external factors, such as a lateral pressure, a bending and the like, are applied to this optical fiber.

Means for Solving the Problems

An optical fiber according to the present invention pertains to an optical fiber, to which a twist, i.e., an elastic torsion with stress, is imparted so as to meet a predetermined condition. That is, when the twist rate, which is the number of rotations per unit length by a twist, is represented by f(z) as a function of a position z in a longitudinal direction of the optical fiber, the f(z) having a predetermined twist cycle and being defined such that a twist rotation angle in one direction and a twist rotation angle in the opposite direction are equal to each other wherein in the twist cycle, and furthermore when a proportionality coefficient representing circular birefringence per twist rate is denoted by g, an angular frequency is denoted by ω, external linear birefringence due to a bending and a lateral pressure is denoted by $\beta_e$, and relational expressions (1a)-(1f) are satisfied, then the twist condition for the optical fiber satisfies at least one of a first condition that a twist error amount A defined by a relational expression (1g) with a twist cycle denoted by L is $8\pi$ (rad) or less, and a second condition that the twist cycle varies in the longitudinal direction across an optimum cycle $L_{opt}$ defined by a relational expression (1h)

$$k=1,2,3,\ldots \quad (1a)$$

$\hat{q}_k(\rho)$: k-th zero point x from the smallest one among $$\left\{F(x) = \frac{gx}{4} + \left(\frac{d_e}{d_1\rho^4 + 0.42d_e(1-\rho^4)} - 1\right)\tan\frac{gx}{4}(x>0)\right\} \quad (1b)$$

$$d_e = \frac{\omega}{\beta_e}\frac{\partial \beta_e}{\partial \omega} \quad (1c)$$

$$d_t = \frac{\omega}{g}\frac{\partial g}{\partial \omega} \quad (1d)$$

$$\gamma_{av} = \langle |f(z)|\rangle = \frac{1}{L}\oint |f(z)|dz \quad (1e)$$

$$\rho = \langle |f(z)|\rangle / \max |f(z)| \quad (1f)$$

$$A = \min_k |\gamma_{av}L - \hat{q}_k(\rho)/1.014| \quad (1g)$$

$$L_{opt} = |L - \hat{q}_k(\rho)/(1.014\gamma_{av})| \quad (1h).$$

It is preferable that the optical fiber according to the present invention satisfies the first condition and that a rectangular parameter $\rho$ defined by the relational expression (1f) is 0.59 or more.

The optical fiber according to the present invention preferably satisfies both of the first condition and the second condition.

It is referable that the optical fiber according to the present invention satisfies the first condition, and that an average twist rate $\gamma_{av}$ defined by the relational expression (1e) is $2\gamma_{th}$ or more when a twist threshold value given by a ratio $(\beta_e/g)$ is denoted by $\gamma_{th}$.

Moreover, it is preferable that the optical fiber according to the present invention is wound in a coil shape, and that the average twist rate $\gamma_{av}$ defined by the relational expression (1e) is $2\gamma_{th}$ or more when a bending diameter is denoted by D, a photoelastic constant is denoted by $\Delta C$, Young's modulus is denoted by E, a glass diameter is denoted by d, a light wavelength is denoted by $\lambda$, and a twist threshold value defined as the ratio $(\beta_e/g)$ using linear birefringence $\beta_e$ given by the following relational expression (2) is denoted by $\gamma_{th}$.

$$\beta_e = \frac{\pi\Delta CE}{\lambda}\left(\frac{d}{D}\right)^2 \quad (2)$$

The optical fiber according to the present invention is characterized in that a twist, which is a torsion imparted after a glass portion of the optical fiber is hardened and the torsional direction thereof being alternately reversed, is given as a function TP(z) of a position z in an axial direction of the optical fiber, the function TP(z) representing a twist rate that is the number of rotations per unit length of the twist, and furthermore in that the cycle of the function TP(z) varies in a predetermined pattern, a random pattern, or a combination of these patterns.

The optical fiber according to the present invention is characterized in that a twist, which is a torsion imparted after a glass portion of the optical fiber is hardened and the torsional direction thereof being alternately reversed, is given as a function TP(z) of a position z in an axial direction of the optical fiber, the function TP(z) representing a twist rate that is the number of rotations per unit length of the twist, and furthermore in that an amplitude of the function TP(z) varies in a predetermined pattern, a random pattern, or a combination of these patterns.

The optical fiber according to the present invention is characterized in that a twist, which is a torsion imparted after a glass portion of the optical fiber is hardened and the torsional direction thereof being alternately reversed, is given as a function TP(z) of a position z in an axial direction of the optical fiber, the function TP(z) representing a twist rate that is the number of rotations per unit length of the twist, and furthermore in that the respective amplitude and cycle of the function TP(z) vary in a predetermined pattern, a random patterns, or a combination of these patterns.

Effects of the Invention

In the optical fiber according to the present invention, PMD will not significantly increase even when external factors, such as a lateral pressure, a bending and the like, are applied.

BRIEF DESCRIPTION OF THE DRAWINGS

FIG. 2 shows views for illustrating a method of manufacturing an optical fiber imparted with a twist;

FIG. 20 shows calculation results of the expected value <EPMD-RF> of EPMD-RF that may occur when a ratio ($\gamma_{av}/\gamma_{th}$) of an average twist amplitude and a twist threshold value is limited to a predetermined value or less;

FIG. 23 shows graphs showing a relationship among $f_{fm}$, $f_{dev}$, and EPMD-RF;

FIG. 24 shows graphs showing a relationship among $f_{fm}$, $f_{dev}$, and EPMD-RF;

FIG. 25 shows graphs showing a relationship among $f_{fm}$, $f_{dev}$, and EPMD-RF;

FIG. 29 shows graphs showing a relationship among $m_d$, $L_{am}$, and EPMD-RF;

FIG. 30 shows graphs showing a relationship among $m_d$, $L_{am}$, and EPMD-RF;

FIG. 31 shows graphs showing a relationship among $m_d$, $L_{am}$, and EPMD-RF;

FIG. 34 shows graphs showing a relationship among $L_{fm}$, $L_L$, and EPMD-RF; and FIG. 35 shows graphs showing a relationship among $L_{fm}$, $L_L$, and EPMD-RF.

DESCRIPTION OF THE REFERENCE NUMERALS

10 . . . optical fiber; 11 . . . base line indicating twist of optical fiber 10; 20 . . . direction of lateral pressure; 100 . . . bobbin; 200 . . . twist imparting device; 210 . . . rotating dice; and 220 . . . optical fiber holding portion.

BEST MODES FOR CARRYING OUT THE INVENTION

In the following, embodiments of an optical fiber according to the present invention will be explained in detail with reference to FIGS. 1 to 35. In the explanation of the drawings, constituents identical to each other will be referred to with numerals identical to each other without repeating their overlapping descriptions.

First Embodiment

Figure 1:
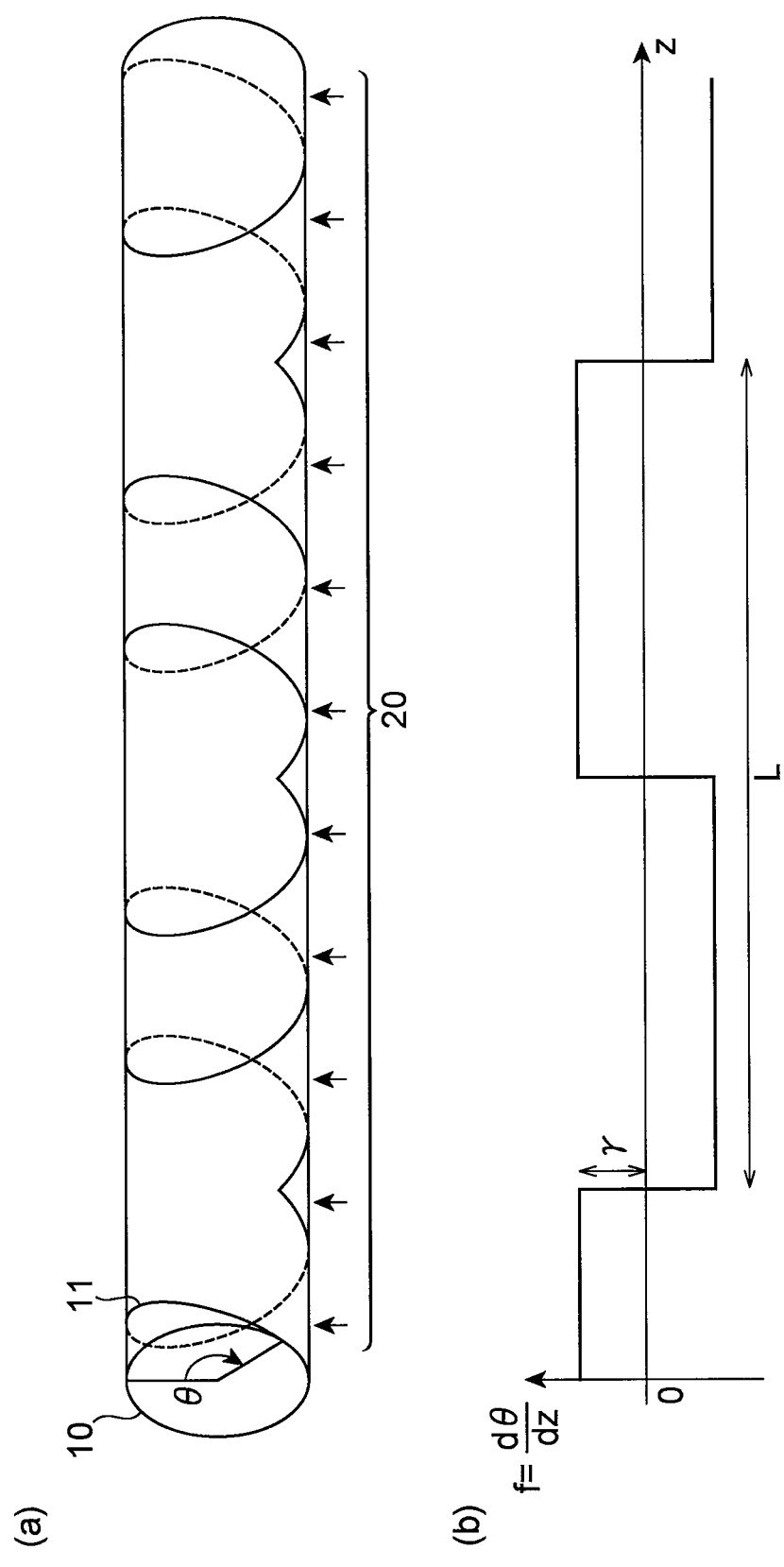
FIG. 1 shows views illustrating impartment of a twist in an optical fiber.

FIG. 1 shows views illustrating impartment of a twist in an optical fiber. The area (a) of FIG. 1 shows a perspective view of an optical fiber 10, and also shows a base line 11 indicating a twist of the optical fiber 10 and a direction 20 of a lateral pressure. The area (b) of FIG. 1 shows an axial distribution of twist rates in the optical fiber 10. The optical fiber 10 is imparted with a twist that is an elastic torsion with stress. When an axial position of the optical fiber 10 is denoted by z and a rotational position of the base line 11 at the position z is denoted by θ, then the twist rate that is the number of rotations per unit length by the twist is represented by "f(z)=dθ/dz" as a function of the position z. As shown in the area (b) of FIG. 1, the twist rate f(z) can be represented as a rectangular wave with amplitude γ and cycle L.

FIG. 2 shows views showing a method of manufacturing the optical fiber 10 imparted with a twist. Namely, as shown in the area (a) of FIG. 2, one end B1 of the optical fiber 10 with glass diameter d is fixed to a bobbin 100. The outer diameter of the body portion of the bobbin 100 is D, and the bobbin 100 rotates along an arrow S1 about a body axis AX and thereby the optical fiber 10 is wound up onto the body portion. At this time, a desired twist is imparted to the optical fiber 10 by a twist imparting device 200. The twist imparting device 200 includes a rotating dice 210 that imparts a twist to the optical fiber 10, and an optical fiber holding portion 220 that rotatably holds the optical fiber 10. Since the optical fiber 10 and the bobbin 100 are in contact with each other at a C1 point, a twist state imparted to the optical fiber 10 is fixed at the C1 point. Therefore, by the rotating dice 210 rotating along an arrow S2 (a first torsional direction) with the C1 point as a fulcrum, a twist is imparted to the optical fiber 10. Since the impartment of a twist to the optical fiber 10 by the twist imparting device 200 is performed while rotating the bobbin 100 along the arrow S1 about the body axis AX, the optical fiber 10 to which a predetermined twist is imparted is wound up onto the body portion of the bobbin 100. This provides the optical fiber 10 that is wound in a coil shape with a bending diameter of D (after the impartment of a twist).

On the other hand, the twist imparting device 200 reverses the torsional direction (the direction indicated by the arrow S2 in the area (b) of FIG. 2) of the rotating dice 210 when a predetermined time has elapsed. At this time, for a part of the optical fiber 10 that is wound up onto the body portion of the bobbin 100, a C2 point serves as the fulcrum for imparting a twist while the imparted twist is maintained (also in this state, the bobbin 100 is rotating at a fixed speed along the arrow S1 about the body axis AX). Namely, the rotating dice 210 rotates along an arrow S3 (a second torsional direction) with the C2 point as the fulcrum, thereby imparting the opposite direction twist to the optical fiber 10.

The other end B2 of the optical fiber 10, which is wound up onto the bobbin 100 while changing the torsional direction at predetermined time intervals, is also fixed to the bobbin 100 along with the one end B1. This provides the optical fiber 10 that is wound up in a coil shape with the bending diameter D as shown in the area (c) of FIG. 2.

The internal birefringence (birefringence due to an internal factor) of the optical fiber 10 is small enough to be regarded as zero. In order to sufficiently reduce the internal birefringence, the anisotropy of the structure or internal stress may be sufficiently reduced or a spin sufficiently large relative to the anisotropy may be imparted. Suppose a case where external birefringence (birefringence due to an external factor, such as a lateral pressure, a bending and the like) with a fixed magnitude and direction in the axis direction is applied to the optical fiber 10.

In the optical fiber 10, a polarization dispersion vector (PDV) of a distance from one end (z=0) to a position z is denoted by $\Omega(z)$. The direction of the PDV is equal to that of Stokes vector in the main polarization state (polarization state where the group velocity becomes maximum or minimum) and the magnitude thereof is equal to that of PMD. It is known that the spatial development of PDV follows the differential equation in the following expressions (3a) and (3b) (for example, see non-Patent Document 2).

$$\frac{\partial \Omega}{\partial z} = W \times \Omega + W_\omega \qquad (3a)$$

$$W(z) = \begin{pmatrix} \beta_e \\ 0 \\ gf(z) \end{pmatrix} \qquad (3b)$$

Where $\beta_e$ is an external birefringence expressed as the propagation constant difference. "g" is a physical property constant called a rotation coefficient and represents the proportionality coefficient of circular birefringence with respect to a twist. Moreover, a subscript $\omega$ represents a partial differentiation with respect to an angular frequency $\omega$. The function f(z) is the twist rate as described above and is represented by the following expression (4) in this embodiment.

$$f(z) = \gamma \operatorname{sgn}\left(\sin \frac{2\pi z}{L}\right) \qquad (4)$$

PMD and PDV can be calculated as a function of the position z by solving the above expression (3). When in the above expression (3), $\Omega$ is expressed as the following expression (5), and the above expression (4) is substituted into the expression (3), and the resultant expression (3) is integrated in a range from a position z=(n−1)L to a position z=nL, then the following expressions (6a)-(6l) are obtained.

$$\Omega_n = \Omega(z=nL) \qquad (5)$$

$$\Omega_n = A\Omega_{n-1} + B \qquad (6a)$$

Where $$A = \qquad 6(c)$$

$$\begin{pmatrix} 1 - 2b_e^2 b_t^2 (1-c_2)^2 & -2b_e^2 b_t s_2 (1-c_2) & -2b_e b_t (1-c_2)(b_t^2 + b_e^2 c_2) \\ -2b_e^2 b_t s_2 (1-c_2) & 1 - 2b_e^2 s_2^2 & -2b_e s_2 (b_t^2 + b_e^2 c_2) \\ 2b_e b_t (1-c_2)(b_t^2 + b_e^2 c_2) & 2b_e s_2 (b_t^2 + b_e^2 c_2) & 1 - 2b_e^2 (1-c_2)(1+b_t^2 + b_e^2 c_2) \end{pmatrix}$$

$$B = \frac{d\beta_e L}{\omega}\begin{pmatrix} b_e^2 + b_t^2 c_2 - \\ b_t s_2 - \\ b_e b_t (1-c_2) \end{pmatrix} + \frac{2b_e b_t \delta}{\omega}\begin{pmatrix} b_t s_2 (1 + b_e^2(1-c_2)) - \\ (1-c_2)(b_t^2 - b_e^2 c_2)) \\ b_e^3 s_2 (1-c_2) \end{pmatrix}$$

$$b_e = \beta_e/\beta \qquad (6d)$$

$$b_t = g\gamma/\beta \qquad (6e)$$

$$\beta = \sqrt{\beta_e^2 + g^2\gamma^2} \qquad (6f)$$

$$c_2 = \cos(\beta L/2) \qquad (6g)$$

$$s_2 = \sin(\beta L/2) \qquad (6h)$$

$$d = b_e^2 d_e + b_t^2 d_t \qquad (6i)$$

$$\delta = d_e - d_t \qquad (6j)$$

$$d_e = \frac{\omega}{\beta_e}\frac{\partial \beta_e}{\partial \omega} \qquad (6k)$$

$$d_t = \frac{\omega}{g}\frac{\partial g}{\partial \omega} \qquad (6l)$$

The physical meaning of the above expressions (6a)-(6l) can be understood as follows. First, a matrix A in the formula (6b) is a rotation matrix. It is known that the rotation matrix can be usually represented by the following expression (7), where e represents a unit vector in the rotating axis direction, $\phi$ represents a rotation angle, E represents a unit matrix, a superscript T represents a transposed matrix, and a superscript x represent an outer product matrix.

$$A = \cos\phi E + (1-\cos\phi)ee^T + \sin\phi e^\times \qquad (7)$$

The result of the substitution of the following expressions (8a)-(8e) into the above expression (7) agrees with the above expression (6a). Therefore, A is a rotation matrix. Moreover, B represents a velocity vector.

$$e = \begin{pmatrix} e_1 \\ e_2 \\ e_3 \end{pmatrix} \qquad 8(a)$$

$$= \frac{\operatorname{sgn}(s_4)}{\sqrt{c_4^2 + b_t^2 s_4^2}}\begin{pmatrix} c_4 \\ -b_t s_4 \\ 0 \end{pmatrix}$$

$$= \frac{1}{\sqrt{(1-c_2)(1+b_t^2+b_e^2c_2)}} \left( -b_t \begin{pmatrix} s_2 \\ 1-c_2 \\ 0 \end{pmatrix} \right)$$

$$\sin\phi = \frac{-4b_e|s_4|(1-2b_e^2 s_4^2)\sqrt{c_4^2+b_t^2 s_4^2} = 2b_e(b_t^2+b_e^2 c_2)}{\sqrt{(1-c_2)(1+b_t^2+b_e^2 c_2)}} \quad (8b)$$

$$\cos\phi = 1 - 8b_e^2 s_4^2(c_4^2+b_t^2 s_4^2) = 1 - 2b_e^2(1-c_2)(1+b_t^2+b_e^2 c_2) \quad (8c)$$

$$c_4 = \cos(\beta L/4) \quad (8d)$$

$$s_4 = \sin(\beta L/4) \quad (8e)$$

Figure 3:
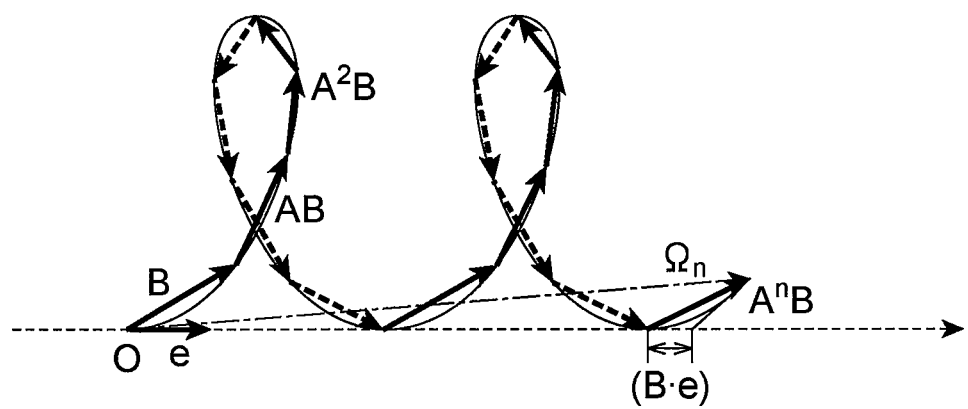
FIG. 3 is a view schematically showing a locus of a polarization dispersion vector $\Omega_n$.

Since $\Omega_0 = 0$ from definition, the solution of the above expressions (6a)-(6l) can be represented by the following expression (9). Since this expression represents an accumulation of vectors (B, AB, A²B, A³B, ...) whose directions rotate at a fixed speed and whose magnitudes are fixed, the locus of $\Omega_n$, is a spiral. FIG. 3 is a view schematically showing a locus of the polarization dispersion vector $\Omega_n$. In the view, "O" indicates the original point.

$$\Omega_n = B + AB + A^2 B + \ldots + A^{n-1} B \quad (9)$$

Since PMD is the magnitude of the polarization dispersion vector PDV, the direct distance from a start point (original point) to an end point in the spiral showing the locus of the PDV is the PMD. Here, when the coordinates are rotated so that the axis of rotation may become the z axis and a variable defined by the coordinate after the rotation is denoted by the variable with a tilde on top, the following expression (10) is obtained. Solving this expression (10) leads to the following expressions (11a) and (11b). Thus, a polarization mode dispersion (PMD) $\tau_n$, is represented by the following expression (12).

$$\tilde{\Omega}_n = \tilde{A}\tilde{\Omega}_{n-1} + \tilde{B} = \begin{pmatrix} \cos\phi & -\sin\phi & 0 \\ \sin\phi & \cos\phi & 0 \\ 0 & 0 & 1 \end{pmatrix} \tilde{\Omega}_{n-1} + \begin{pmatrix} \tilde{B}_1 \\ \tilde{B}_2 \\ \tilde{B}_3 \end{pmatrix} \quad (10)$$

$$\begin{pmatrix} \tilde{\Omega}_{1,n} \\ \tilde{\Omega}_{2,n} \end{pmatrix} = \frac{\sin(n\phi/2)}{\sin(\phi/2)} \begin{pmatrix} \cos((n-1)\phi/2) & -\sin((n-1)\phi/2) \\ \sin((n-1)\phi/2) & \cos((n-1)\phi/2) \end{pmatrix} \begin{pmatrix} \tilde{B}_1 \\ \tilde{B}_1 \end{pmatrix} \quad (11a)$$

$$\tilde{\Omega}_{3,n} = n\tilde{B}_3 \quad (11b)$$

$$\tau_n = \tau(z = nL) = |\Omega_n| = |\tilde{\Omega}_n| = \sqrt{\left(n\tilde{B}_3\right)^2 + \left(\frac{\sin(n\phi/2)}{\sin(\phi/2)}\right)^2 \left(\tilde{B}_1^2 + \tilde{B}_2^2\right)} \quad (12)$$

Here, since the axis of rotation is set to the z axis, a velocity vector B defined by the coordinates after the rotation is represented by the following expressions (13a) and (13b). Using these expressions, the above expression (12) leads to the following expression (14).

$$\tilde{B}_3 = B \cdot e \quad (13a)$$

$$\tilde{B}_1^2 + \tilde{B}_2^2 = |B|^2 - (B \cdot e)^2 \quad (13b)$$

$$\tau_n = \sqrt{n^2(B \cdot e)^2 + \left(\frac{\sin(n\phi/2)}{\sin(\phi/2)}\right)^2 (|B|^2 - (B \cdot e)^2)} \quad (14)$$

In the root sign on the right side of the above expression (14), the first term indicates the development in the spiral axis direction and the second term indicates the rotation about the spiral axis. For practical use of an optical fiber as a communication transmission line, the length of the optical fiber is usually sufficiently longer than the twist cycle and therefore the first term in the root sign on the right side of the above expression (14) becomes dominant. In this case, the above expression (14) results in the following expression (15).

$$\tau_n \approx nB \cdot e = (B \cdot e/L)z \quad (15)$$

From the above expression (6c) and expression 8(a), the following expression (16) can be satisfied. Moreover, from the above expression (6c), the following expression (17) can be satisfied. From these expressions, the following expression (18) is derived.

$$B \cdot e = \mathrm{sgn}(s_4) b_e \frac{d\beta L c_4 + 4b_t^2 \delta s_4}{\omega \sqrt{c_4^2 + b_t^2 s_4^2}} \quad (16)$$

$$|B| = \frac{b_e}{\omega} \left( \sqrt{(d\beta L + 4\delta b_t^2 s_4 c_4)^2 + (4\delta b_t s_4^2)^2} \right)^2 \quad (17)$$

$$|B|^2 - (B \cdot e)^2 = \frac{b_e^2 b_t^2 s_4^2 (d\beta L - 4\delta b_e^2 s_4 c_4)^2}{\omega^2 (c_4^2 + b_t^2 S_4^2)} \quad (18)$$

From the above expression (14), expression (16), and expression (18), PMD can be represented by the following expression (19). Moreover, as with the above expression (14), the first term of the numerator in the root sign on the right side becomes dominant in a sufficiently long optical fiber, so the following expression (19) leads to the following expression (20).

$$\tau_n = \tau(z = nL) = \frac{b_e}{\omega} \sqrt{\frac{n^2 \{d\beta L c_4 + 4b_t^2 \delta S_4\}^2 + \left(\frac{\sin(n\phi/2)}{\sin(\phi/2)}\right)^2 \{b_t S_4 (d\beta L - 4\delta b_e^2 s_4 c_4)\}^2}{c_4^2 + b_t^2 S_4^2}} \quad (19)$$

$$\tau_n \cong \frac{|B \cdot e|}{L} z = \frac{b_e |d\beta L c_4 + 4b_t^2 \delta s_4|}{L\sqrt{c_4^2 + b_t^2 s_4^2}} \frac{z}{\omega} \quad (20)$$

Namely, the magnitude of a projection component in the spiral axis direction e of the velocity vector B represents the PMD per twist cycle. Moreover, the PMD per unit length is given by an α parameter of the following expressions (21a)-(21c). Since a vector e' of the expression (21c) is equal to the unit vector e in the spiral axis direction of the above expression 8(a), B' in the expression (21a) corresponds to the velocity vector B of PDV development. Then, B' is called a pseudo velocity vector. The expression (21a) indicates that the PMD per unit length is determined by the magnitude of a projection component of the pseudo velocity vector B' in the spiral axis direction e'.

$$\alpha = \frac{2\pi c \tau_n}{z} \quad (21a)$$

$$\cong \frac{2\pi c |B \cdot e|}{L}$$

$$= \frac{b_e |dc_4 \beta \lambda + 4b_t^2 \delta s_4 \lambda / L|}{\sqrt{c_4^2 + b_t^2 s_4^2}}$$

$$= |B' \cdot e'|$$

$$B' = \begin{pmatrix} db_e \beta \lambda - \\ 4b_e b_t \delta \lambda / L \end{pmatrix} \quad (21b)$$

$$e' = \frac{\text{sgn}(s_4)}{\sqrt{c_4^2 + b_t^2 s_4^2}} \begin{pmatrix} c_4 - \\ b_t s_4 \end{pmatrix} \quad (21c)$$

Consequently, in order to minimize PMD, it is preferable to select the amplitude γ and cycle L of a twist so as to minimize the projection component of the pseudo velocity vector B' represented by the expression (21b) in the spiral axis vector e' represented by the expression (21c), and furthermore it is preferable to select the external birefringence $\beta_e$ as well when possible. Of course, when the length of an optical fiber is not sufficiently long, the above-described parameters may be selected so as to minimize the polarization mode dispersion (PMD) $\tau_n$ represented by the above expression (19).

Next, the effectiveness of external PMD reduction by a twist is represented by the following expression (22) as a reduction factor EPMD-RF (external PMD reduction factor). The PMD when there is a twist is represented by the above expression (20) (strictly speaking, by the above expression (19)). On the other hand, when there is no twist, $b_e=1$ and $b_1=0$ are obtained from the above expressions (6d) to (6f), and $d=d_e$ is obtained from the above expression (6i). Therefore, the above expressions (6b) and (6c) result in the following expressions (23a) and (23b), and from the above expression (7) the PDV is represented by the following expression (24) and the PMD is represented by the following expression (25).

$$EPMD - RF = \frac{PMD \text{ when there is a twist}}{PMD \text{ when there is no twist}} \quad (22)$$

$$A = \begin{pmatrix} 1 & 0 & 0 \\ 0 & 1 - 2s_2^2 & -2s_2 c_2 \\ 0 & 2s_2 c_2 & 1 - 2s_2^2 \end{pmatrix} \quad (23a)$$

$$B = \frac{d_e \beta_e L}{\omega} \begin{pmatrix} 1 \\ 0 \\ 0 \end{pmatrix} \quad (23b)$$

$$\Omega_n = nB = \frac{nb_e d_e \beta L}{\omega} \begin{pmatrix} 1 \\ 0 \\ 0 \end{pmatrix} \quad (24)$$

$$\tau_n = \frac{nb_e d_e \beta L}{\omega} \quad (25)$$

Consequently, substituting the above expressions (19) and (25) into the expression (22), reduction factor EPMD-RF of the external PMD can be calculated as in the following expression (26). Moreover, in a sufficiently long optical fiber, EPMD-RF can be expressed as the following expressions (27a) and (27b). The expressions (27a) and (27b) indicates that the external PMD can be reduced to the minimum by selecting the amplitude γ and cycle L of a twist and furthermore, if further possible, by selecting the external birefringence $\beta_e$ so as to minimize the projection component in the spiral axis direction e' of a normalized velocity vector C.

$$EPMD - RF = \frac{1}{d_e \sqrt{c_4^2 + b_t^2 s_4^2}} \quad (26)$$

$$\sqrt{\left\{dc_4 + \frac{4\delta b_t^2 s_4}{\beta L}\right\}^2 + \left(\frac{\sin(n\phi/2)}{n\sin(\phi/2)}\right)^2 \left\{b_e b_t s_4 \left(\frac{d}{b_e} - \frac{4\delta b_e s_4 c_4}{\beta L}\right)\right\}^2}$$

$$EPMD - RF = \frac{1}{\sqrt{c_4^2 + b_t^2 s_4^2}} \left| c_4 \frac{d}{d_e} + b_t s_4 \frac{4\delta b_t}{d_e \beta L} \right| = |C \cdot e'| \quad (27a)$$

$$C = \begin{pmatrix} d/d_e - \\ 4\delta b_t / (d_e \beta L) \end{pmatrix} \quad (27b)$$

The amplitude γ and cycle L of a twist can be adjusted using the known technology described in Patent Document 1, for example. Moreover, the magnitude of the external birefringence $\beta_e$ can be adjusted by the bending radius or lateral pressure of the optical fiber. However, some of external birefringences are generated by the causes not intended by the designer or user (e.g., the meandering of an optical fiber within a cable, the expansion/contraction of a reel, the function between adjacent optical fibers within a spool, and the like) and it is therefore often difficult to adjust these external birefringences to a fixed value. However, by intentionally imparting a large birefringence beyond a range of the predicted values of these unintended external birefringences, the variations in the value of external birefringence due to the unintended factors can be suppressed, and the minimizing conditions of the external PMD given in the expressions (27a) and (27b), or the expression (26) can be satisfied stably.

Methods, such as a method of applying an asymmetrical lateral pressure to a core by a thermal contraction stress of tape resin in a tape core, a method of applying a bending by spirally moving an optical fiber within a cable, and a method of reducing the winding diameter in an optical fiber in a reeled state or in a coreless coil state, are simple and quite reproducible as the method of intentionally imparting external birefringence, and therefore quite practical. The properties of the birefringence occurring in an optical fiber due to a bending or a lateral pressure can be found from the formulas disclosed in non-Patent Document 3 and the like.

For example, the birefringence $\beta_e$ when a bending with the diameter D is imparted to an optical fiber is represented by the following expression (28), where ΔC is a photoelastic constant, E is a Young's modulus, d is the glass diameter of the optical fiber, and λ is a light wavelength.

$$\beta_e = \frac{\pi \Delta C E}{\lambda} \left(\frac{d}{D}\right)^2 \quad (28)$$

Moreover, as shown below, by providing an optical fiber with a sufficiently large twist as compared with the external birefringence, the external PMD can be minimized regardless of the value of the external birefringence. Namely, a twist sufficiently larger than (e.g., three times or more, more preferably ten times or more) a twist threshold value $\gamma_{th}$ given by the following expression (29) is applied. At this time, since there is a relationship represented by the following expression (30), the following expressions (31) and (32) are given. That is, the above expressions (27a) and (27b) results in the following expression (33).

$$\gamma_{th} = \beta_e / g \quad (29)$$

$$g\gamma \gg \beta_e \quad (30)$$

$$\beta = g\gamma \sqrt{1 + \left(\frac{\beta_e}{g\gamma}\right)^2} \cong g\gamma \quad (31)$$

$$d = d_t b_t^2 \left\{ 1 + \frac{d_e}{d_t}\left(\frac{\beta_e}{g\gamma}\right)^2 \right\} \cong d_t b_t^2 \quad (32)$$

$$EPMD - RF = \frac{4 d_t b_t^2 c_4}{d_e g\gamma L \sqrt{c_4^2 + b_t^2 s_4^2}} \left| \frac{\delta}{d_t} \tan\left(\frac{g\gamma L}{4}\right) + \frac{g\gamma L}{4} \right| \quad (33)$$

Figure 4:
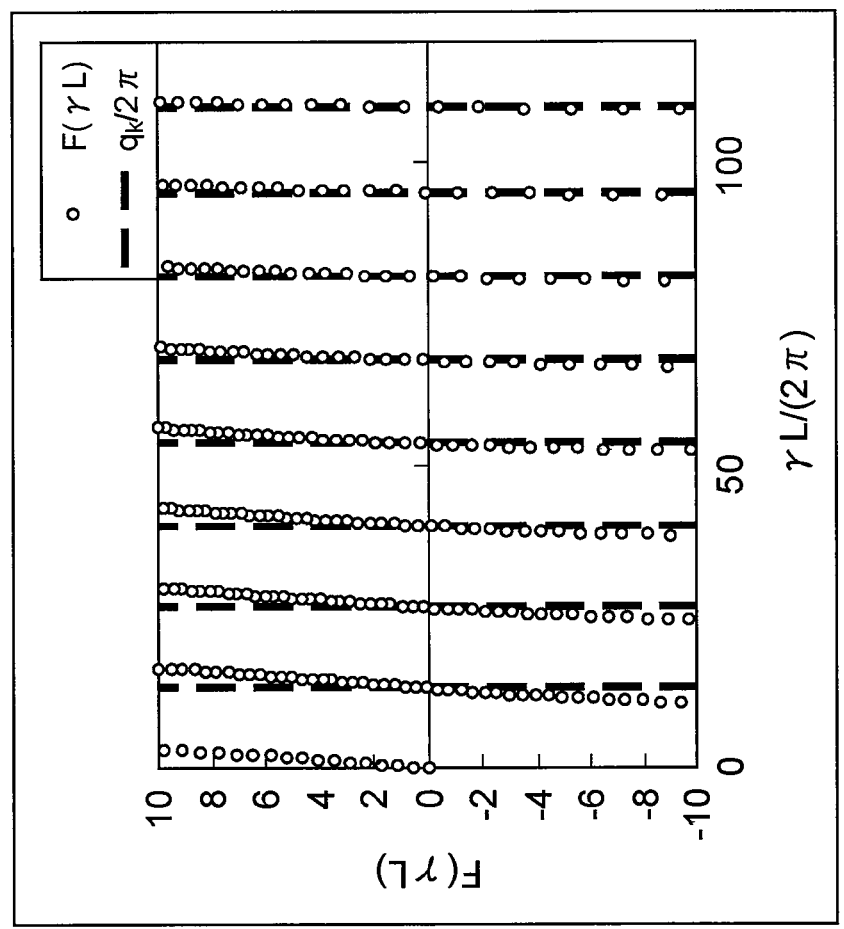
FIG. 4 shows views showing the values of $q_k$ that are calculated using physical property parameters according to a reference document.

The above expression (33) takes zero, which is the minimum value, when the following expressions (34a) and (34b) is satisfied. The left side of the expression (34a) represents a sum of rotation angles over one twist cycle. Moreover, the right side $q_k$ is determined by the expression (34b). All of g, $d_e$, and $d_t$ in the expression (34b) are physical property parameters determined by the material of an optical fiber. In the case of communication optical fibers where PMD is a problem, the material of the optical fiber is silica glass in most cases. Non-Patent Document 4 discloses that the values of the above-described physical property parameters in silica-based glass are empirically g=0.14, $d_e$=1.085, and $d_t$=0.085. FIG. 4 shows views showing the values of $q_k$ calculated using the physical property parameters according to this reference document.

$$\gamma L = q_k \quad k=1,2,3\ldots \quad (34a)$$

$\hat{q}_k(\rho)$: k-th zero point x from the smallest one among $$\left\{ F(x) = \frac{gx}{4} + \left( \frac{d_e}{d_t \rho^4 + 0.42 d_e(1-\rho^4)} - 1 \right) \tan\frac{gx}{4} \, (x > 0) \right\} \quad (34b)$$

Consequently, by adjusting the twist conditions so that any of a set $(q_k)$ of values determined by substituting the physical property parameters (typically, g=0.14, $d_e$=1.085, and $d_t$=0.085) of the material (usually silica glass) constituting an optical fiber into the above expression (34) may become equal to a total rotation angle $\gamma L$ over one twist cycle, the occurrence of the external PMD can be minimized regardless of the magnitude of the external birefringence.

Figure 5:
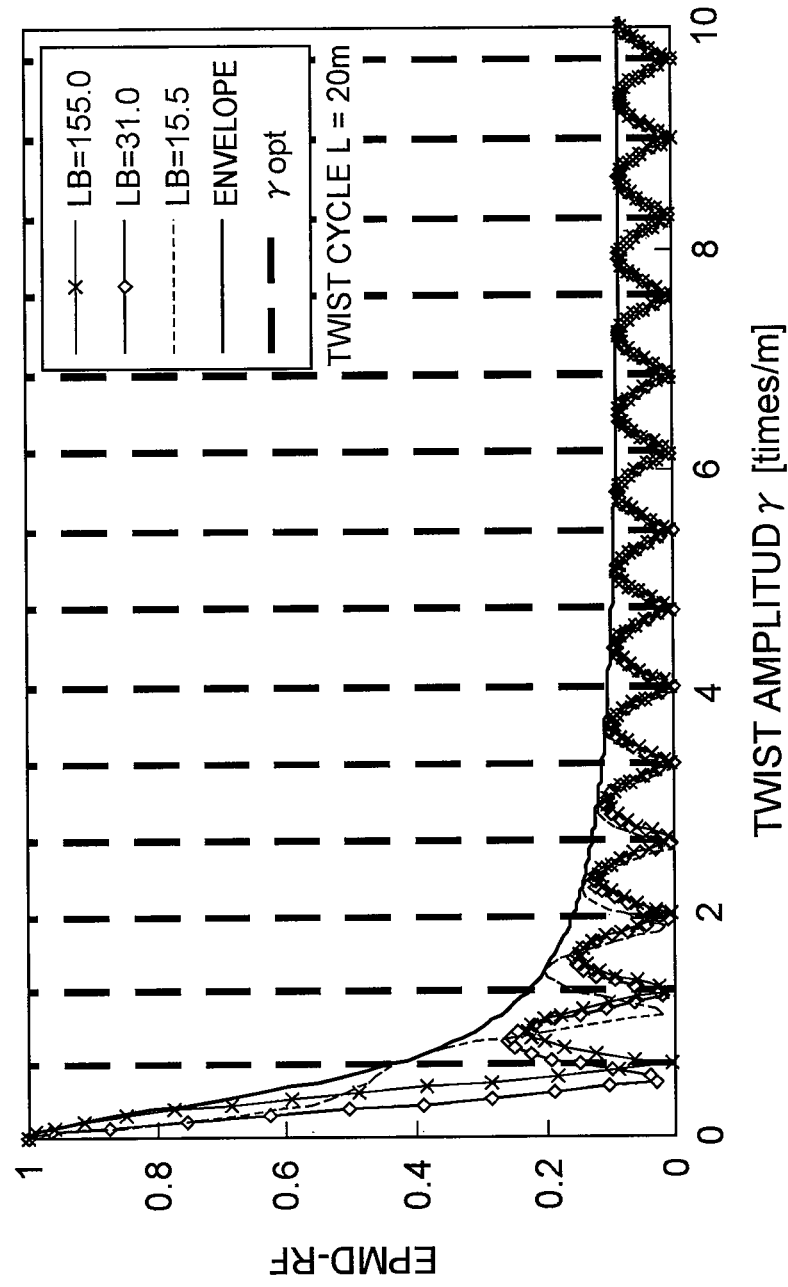
FIG. 5 is a view showing EPMD-RF when a twist cycle L is 20 m.

Next, as a numerical example, the EPMD-RF given by the above expressions (27a) and (27b) is shown in FIG. 5 when the twist cycle L is 20 m. In FIG. 5, the magnitude of external birefringence is shown in terms of the beat length $L_B=2\pi/\beta_e$. Moreover, the optimum twist amplitude $\gamma_{opt}$ given by the above expressions (34a) and (34b) is also shown in FIG. 5. As shown in FIG. 5, by selecting the optimum twist amplitude of the expressions (34a) and (34b), the external PMD can be minimized regardless of the magnitude of external birefringence. Moreover, FIG. 5 shows the envelope of EPMD-RF in the case of the beat length $L_B$=15.5 m. This envelope can be represented by the following expression (35) from the above expressions (27a) and (27b). This envelope indicates the worst value of the EPMD-RF that may occur when the twist amplitude $\gamma$ and the cycle L deviate from the optimal condition of the above expressions (34a) and (34b).

$$EPMD - RF_{env} = |C| = \frac{1}{d_e}\sqrt{d^2 + \left(\frac{4\delta b_t}{\beta L}\right)^2} \quad (35)$$

Figure 6:
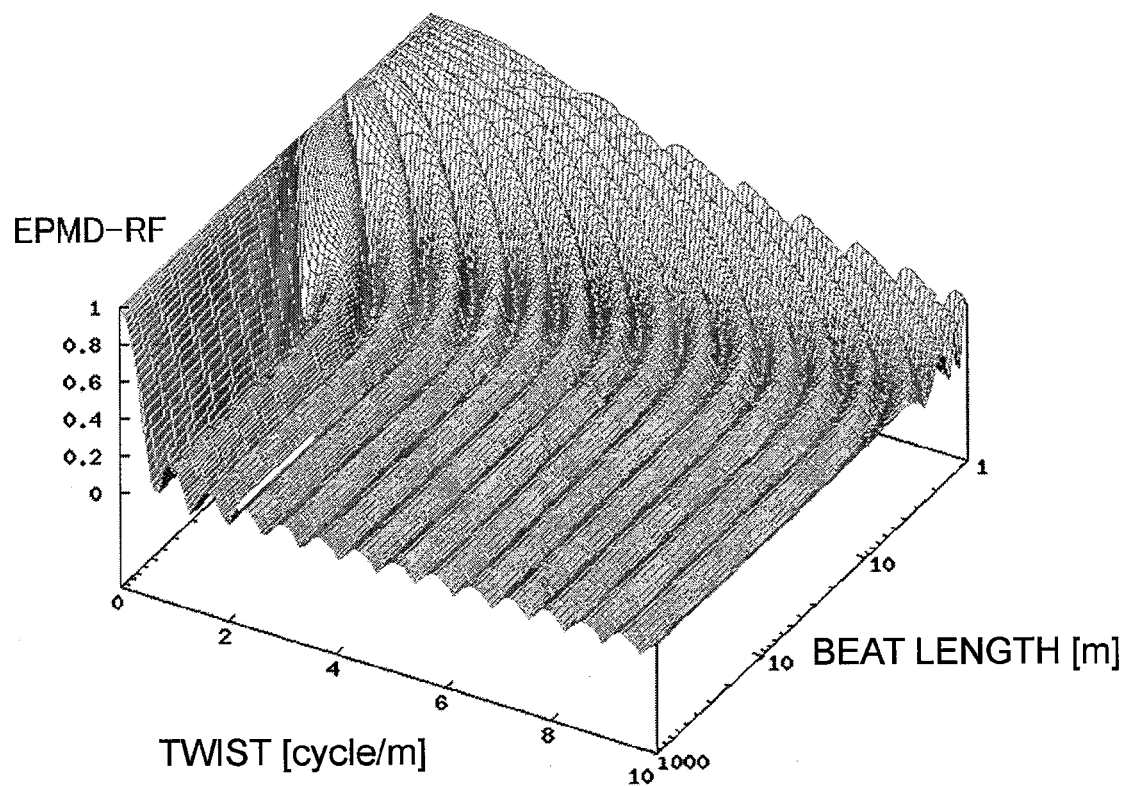
FIG. 6 is a three-dimensional plot of EPMD-RF with respect to the magnitude of external birefringence and the twist amplitude.
Figure 7:
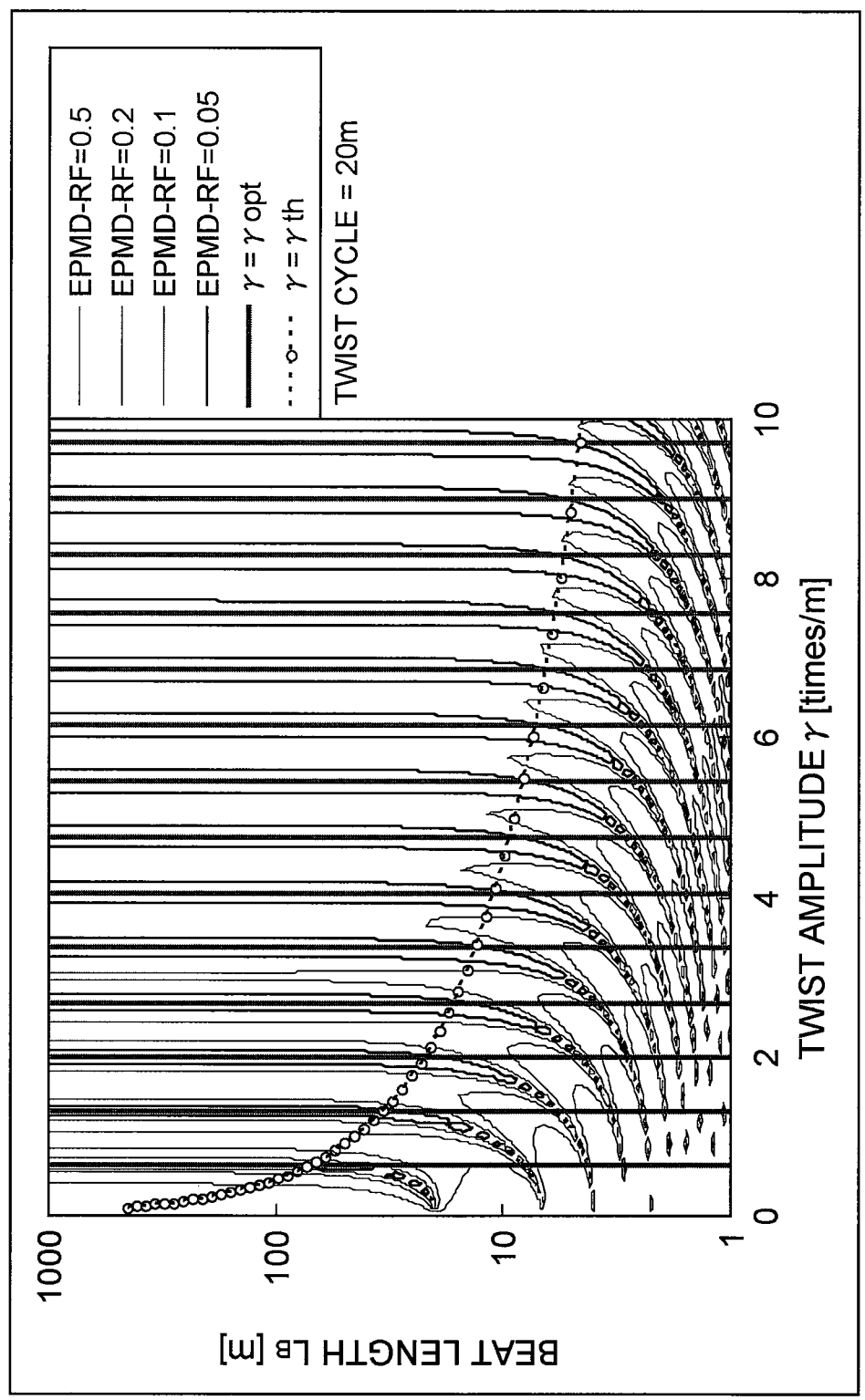
FIG. 7 is a contour-line display of EPMD-RF with respect to the magnitude of external birefringence and the twist amplitude.

Moreover, as another numerical example, a three-dimensional plot of EPMD-RF with respect to the magnitude of external birefringence and the twist amplitude is shown in FIG. 6, and a contour-line display thereof is shown in FIG. 7. Moreover, FIGS. 6 and 7 also show the twist threshold value $\gamma_{th}$ given by the above expression (29) and the optimum twist amplitude $\gamma_{opt}$ given by the above expression (34a) and (34b). As shown in these views, by setting the twist amplitude $\gamma$ larger than the twist threshold value $\gamma_{th}$ and also setting the twist amplitude $\gamma$ equal to any of the optimum twist amplitudes $\gamma_{opt}$, the external PMD reduction factor EPMD-RF can be minimized regardless of the beat length $L_B$ of external birefringence.

Second Embodiment

Next, as a second embodiment, the PMD reduction performance when using twist waveforms other than a rectangular wave is described. In the case of the twist waveform of non-rectangular wave, PMD and EPMD-RF can be calculated by numerically integrating the above expressions (6a)-(6l).

Figure 8:
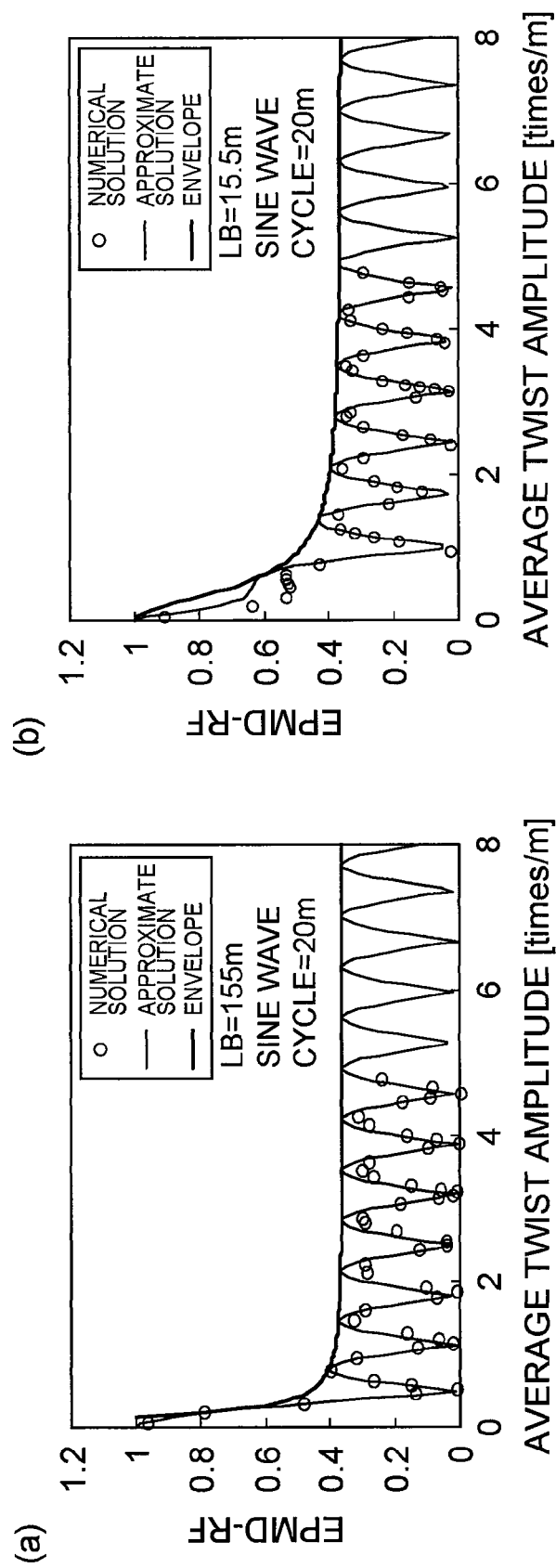
FIG. 8 shows calculation results of EPMD-RF when a twist rate f(z) is represented by a sine wave.
Figure 9:
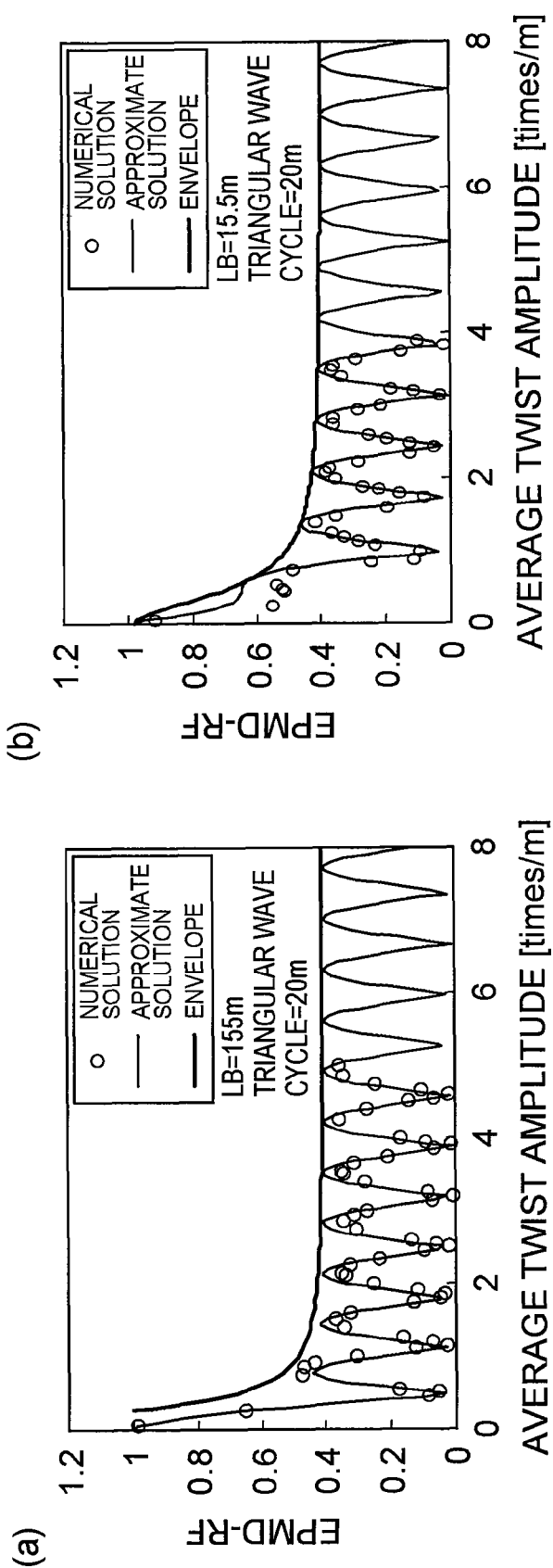
FIG. 9 shows calculation results of EPMD-RF when the twist rate f(z) is represented by a triangular wave.
Figure 10:
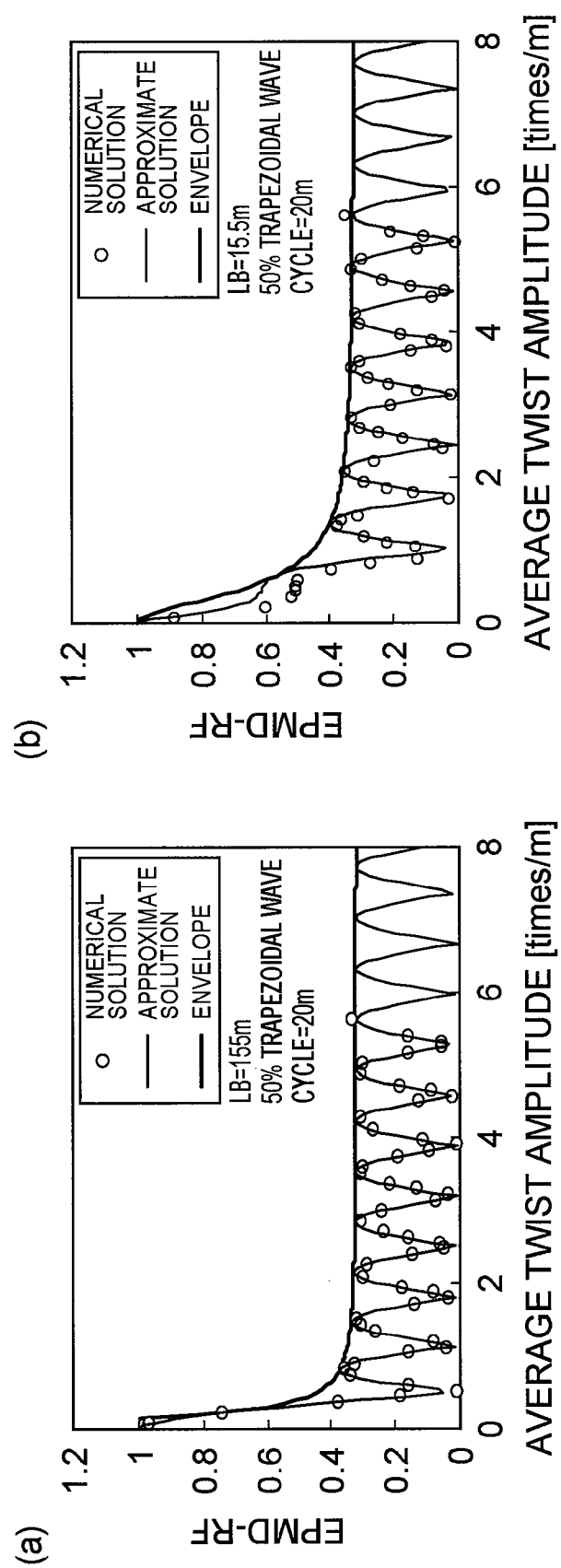
FIG. 10 shows calculation results of EPMD-RF when the twist rate f(z) is represented by a trapezoidal wave with a duty ratio of 50%.
Figure 11:
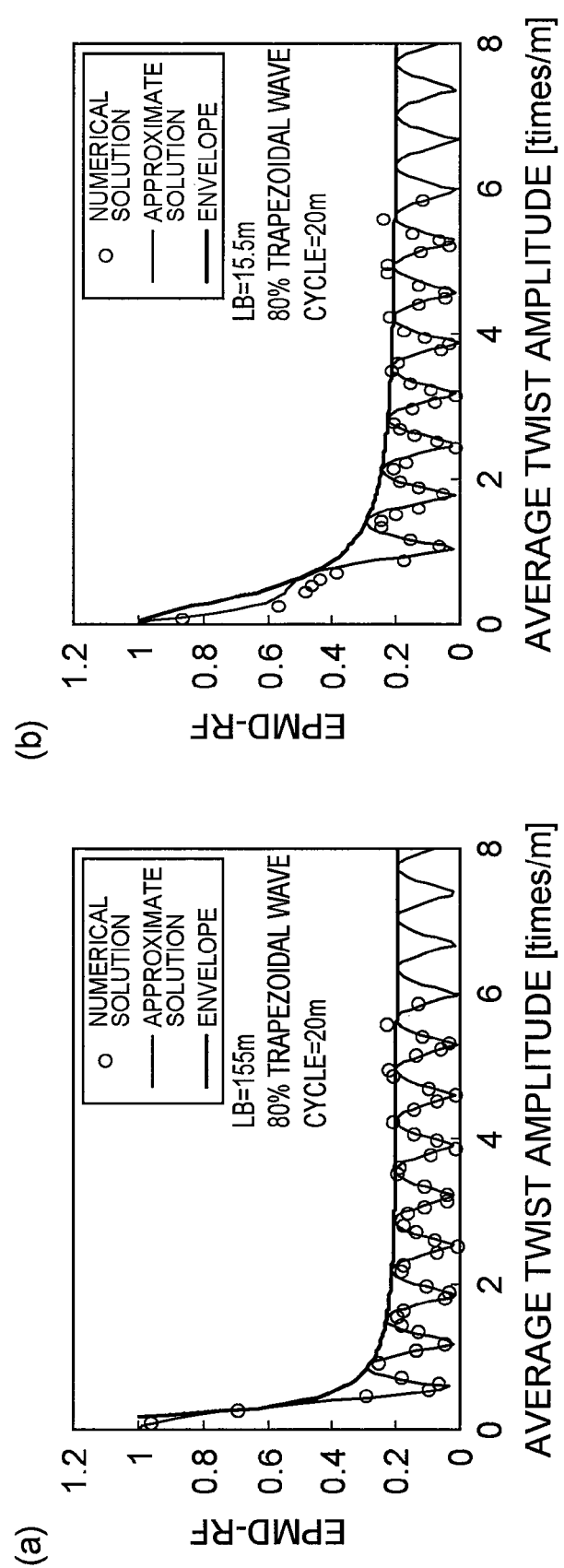
FIG. 11 shows calculation results of EPMD-RF when the twist rate f(z) is represented by a trapezoidal wave with a duty ratio of 80%.
Figure 12:
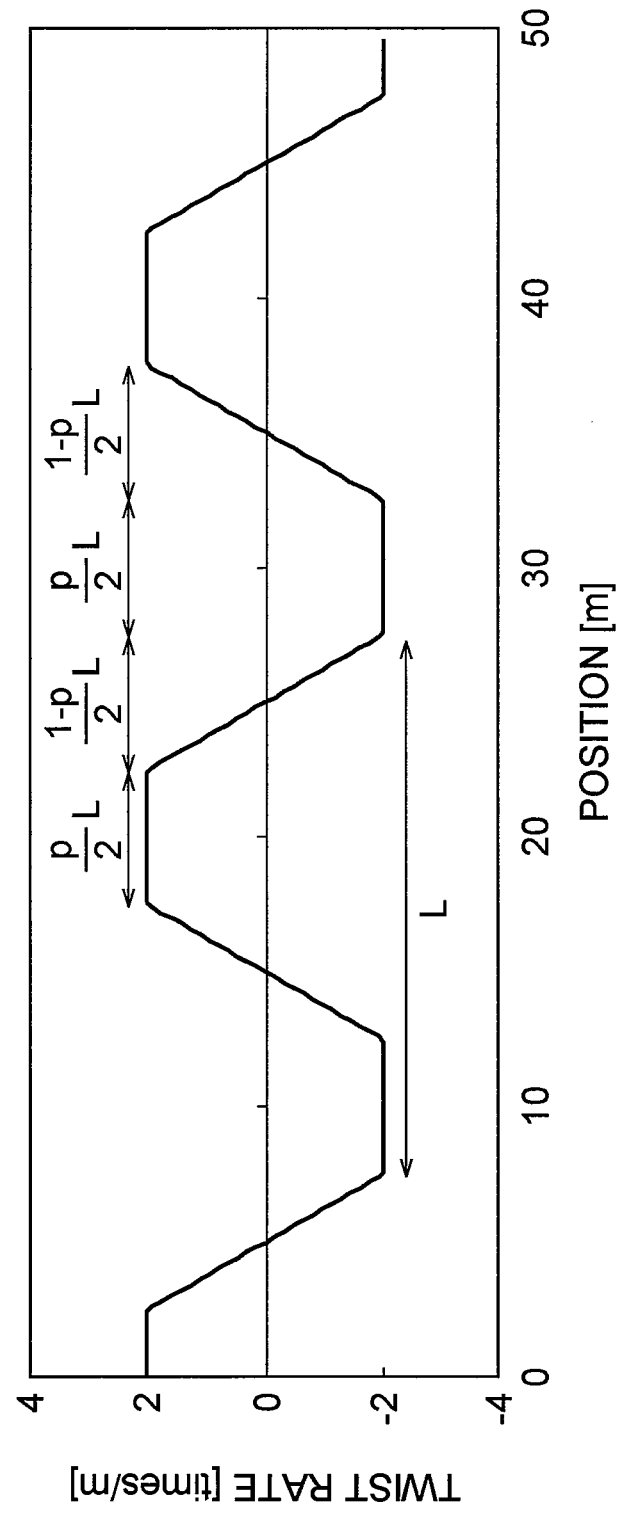
FIG. 12 is a view illustrating the duty ratio of a trapezoidal wave.

FIG. 8 shows calculation results of EPMD-RF when the twist rate f(z) is represented by a sine wave. FIG. 9 shows the calculation results of EPMD-RF when the twist rate f(z) is represented by a triangular wave. FIG. 10 shows the calculation results of EPMD-RF when the twist rate f(z) is represented by a trapezoidal wave with a duty ratio of 50%. Moreover, FIG. 11 shows the calculation results of EPMD-RF when the twist rate f(z) is represented by a trapezoidal wave with a duty ratio of 80%. Note that the duty ratio of the trapezoidal wave is the ratio occupied by the flat part of the trapezoid and is defined by a variable p in FIG. 12.

In FIGS. 8 to 11, the twist cycle L is set to 20 m. Moreover, in each area (a) of FIGS. 8, 9, 10 and 11, the beat length $L_B$ of the external birefringence is set to 155 m, while in each area (b) of FIGS. 8, 9, 10 and 11, the beat length $L_B$ of the external birefringence is set to 15.5 m. The EPMD-RF obtained by numerically integrating the above expressions (6a)-(6l) is plotted and illustrated with respect to the average twist amplitude. Here, the average twist amplitude $\gamma_{av}$ is the average absolute value of the twist rate and is represented by the following expression (36). Moreover, in FIGS. 8 to 11, there is shown an approximate expression of the EPMD-RF. This approximate expression is EPMD-RF$_{eff}$ given by the following expression (37).

$$\gamma_{av} = \langle |f(z)| \rangle = \frac{1}{L}\oint |f(z)| dz \quad (36)$$

$$EPMD - RF_{eff} = \frac{1}{\sqrt{\hat{c}_4^2 + \hat{b}_t^2 \hat{s}_4^2}} \left| \hat{c}_4 \frac{\hat{d}}{d_e} + \hat{b}_t \hat{s}_4 \frac{4\delta \hat{b}_t}{d_e \beta L} \right| = |\hat{C} \cdot \hat{e}'| \quad (37)$$

Where, EPMD-RF$_{eff}$ is the EPMD-RF obtained by replacing the twist amplitude $\gamma$ and the frequency dispersion $d_t$ of the rotational factor with an effective twist rate (expression (38a)) and an effective dispersion (expression (38b)) given by the following expressions (38a)-(38c), on the right side of the above expressions (27a) and (27b), and in each of the relevant expressions on which the expressions (27a) and (27b)

depend. On the right side of the expression (37), a variable with a hat on top indicates a value calculated by performing the above-described replacement. The parameter ρ given by the expression (38c) is a ratio of the mean amplitude of a waveform relative to the peak amplitude thereof, and is called a rectangular parameter because the parameter ρ takes the maximum value 1 at the time of a rectangular wave. The coefficients and multiplier (1.014, 0.42, 4) in the expressions (38a) and (38b) are values empirically derived from the numerical solutions of FIGS. 8 to 11 by the inventor, and as shown in these views, these values faithfully reproduce the behavior of the numerical solution.

$$\hat{\gamma} = 1.014 \gamma_{av} \tag{38a}$$

$$\hat{d}_t = d_t \rho^4 + 0.42 d_e (1 - \rho^4) \tag{38b}$$

$$\rho = \langle |f(z)| \rangle / \max |f(z)| \tag{38c}$$

Moreover, with regard to the optimum twist condition under which EPMD-RF becomes the minimum, as with the same discussion leading to the expressions (27a) to (34b), the following expression (40) is satisfied when the following expression (39) is satisfied. Consequently, the relational expression that gives the optimum average twist amplitude and twist cycle are given by the following expressions (41a) and (41b). The optimal condition indicated by the expressions (41a) and (41b) is satisfied regardless of the waveforms, such as a triangular wave, a sine wave, and a trapezoidal wave. Under the actual manufacturing conditions and use conditions, the twist waveform may not precisely agree with a triangular wave, a sine wave, or a trapezoidal wave, but the external PMD can be minimized by substantially satisfying the above-described optimal condition even in such a case.

$$\gamma_{av} \gg \gamma_{th} = \beta_e / g \tag{39}$$

$$EPMD - RF_{eff} = \frac{4 \hat{d}_t \hat{b}_t^2 \hat{c}_4}{d_e g \hat{\gamma} L \sqrt{\hat{c}_4^2 + \hat{b}_t^2 \hat{s}_4^2}} \left| \frac{\hat{\delta}}{\hat{d}_t} \tan\left(\frac{g \hat{\gamma} L}{4}\right) + \frac{g \hat{\gamma} L}{4} \right| \tag{40}$$

$$1.014 \gamma_{av} L = \hat{q}_k(\rho) \quad k = 1, 2, 3, \ldots \tag{41a}$$

$\hat{q}_k(\rho)$: k-th zero point x from the smallest one among $$\left\{ F(x) = \frac{gx}{4} + \left( \frac{d_e}{d_t \rho^4 + 0.42 d_e (1 - \rho^4)} - 1 \right) \tan \frac{gx}{4} (x > 0) \right\} \tag{41b}$$

Figure 19:
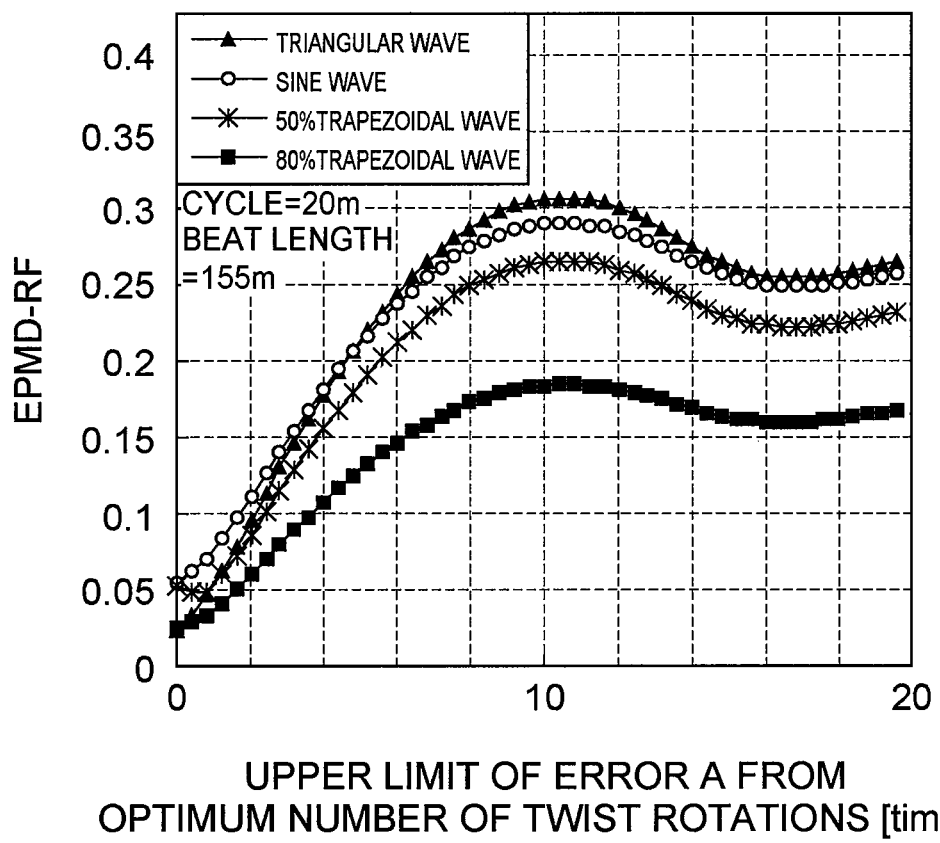
FIG. 19 shows calculation results of the expected value <EPMD-RF> of EPMD-RF that may occur when an error A from an optimum number of twist rotations is limited to a predetermined value or less.

In particular, when an error A from the optimum number of twist rotations is defined as in the following expression (42) and the expected value <EPMD-RF> of EPMD-RF, which may occur when A is limited to a fixed upper limit or less, is calculated, then the results shown in FIG. 19 are obtained. As shown in FIG. 19, it is possible to reduce the expected value of EPMD-RF by limiting A to within a smaller range, and in particular, when the upper limit of A is set to four times (8π [rad]) or less, more preferably two times (4π [rad]) or less, it is possible to keep particularly the expected value of EPMD-RF low. On the other hand, as the upper limit of A is increased, the expected value of EPMD-RF will converge within a certain range. This value corresponds to the expected value of EPMD-RF predicted in the prior arts (for example, Patent Document 1) where the number of twist rotations is not limited in particular. Consequently, by setting the upper limit of A to four times (8π [rad]) or less, more preferably two times (4π [rad]) or less, the expected value of EPMD-RF can be kept low as compared with the prior arts.

$$A = \min_k |\gamma_{av} L - \hat{q}_k(\rho) / 1.014| \tag{42}$$

Moreover, as shown in the expression (39), it is more preferable to increase the average twist amplitude $\gamma_{av}$ than to increase the twist threshold value $\gamma_{th}$ that is determined by external birefringence. This is specifically described below. That is, when the expected value <EPMD-RF> of EPMD-RF, which is predicted when the ratio ($\gamma_{av}/\gamma_{th}$) is limited to a fixed lower limit or more, is calculated, the results as shown in FIG. 20 are obtained. The area (a) of FIG. 20 shows the case where the error A from the optimum number of twist rotations is limited to four times or less (8π [rad]), while the area (b) of FIG. 20 shows the case where the error A from the optimum number of twist rotations is limited to two times or less (4π [rad]). As apparent from the views, by setting the ratio ($\gamma_{av}/\gamma_{th}$) to two or more, more preferably four or more, the expected value of EPMD-RF can be reduced.

Moreover, the envelope of EPMD-RF$_{eff}$ is also shown in FIGS. 8 to 11. With regard to the envelope, likewise, by substituting the effective twist rate (expression (38a)) and the effective dispersion (expression (38b)) into the above expression (35), the following expression (43) is obtained. Particularly, an asymptotic value (a converged value on the right side of the graph), when the twist amplitude is sufficiently large and the above expression (39) is satisfied, corresponds to the worst value (maximum value) of EPMD-RF that may occur when a twist with a sufficiently large amplitude is imparted. When this asymptotic value is called AW-EPMD-RF (Asymptotic Worst EPMD-RF), then AW-EPMD-RF is given by the following expression (44).

$$EPMD - RE_{env,eff} = |\hat{C}| = \frac{1}{d_e} \sqrt{\hat{d}^2 + \left(\frac{4 \delta \hat{b}_t}{\beta L}\right)^2} \tag{43}$$

$$AW\text{-}EPMD\text{-}RF = \hat{d}_t / d_e = (d_t / d_e) \rho^4 + 0.42 (1 - \rho^4) \tag{44}$$

Figure 13:
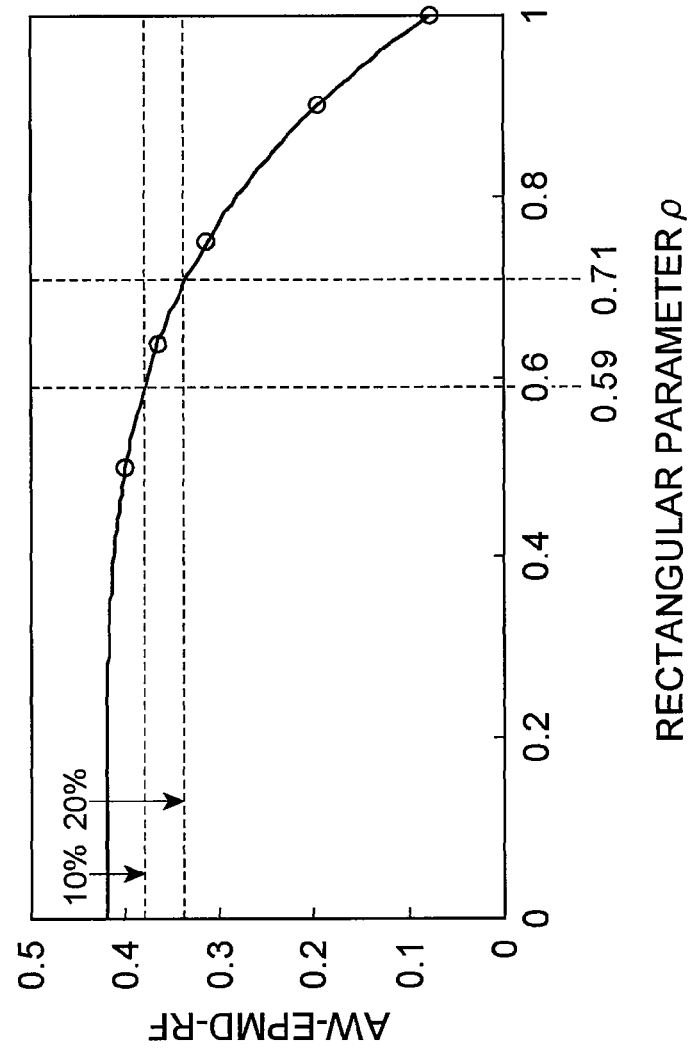
FIG. 13 shows views showing AW-EPMD-RF derived from envelopes of FIGS. 8 to 11 and AW-EPMD-RF given by a formula as a plot and a line.

FIG. 13 shows views showing the AW-EPMD-RF derived from the envelopes of FIGS. 8 to 11 and the AW-EPMD-RF given by the expression (44) as a plot and a line. Moreover, FIG. 13 also shows also show the rectangular parameters of the respective waveforms. As shown in FIG. 13, by making the twist waveform closer to the rectangular wave (making the rectangular parameter closer to the value of one), the worst value (AW-EPMD-RF) of EPMD-RF, which may occur when the twist amplitude deviates from the optimum value (due to an error and the like during manufacturing) can be reduced. Namely, the external PMD can be reduced more reliably. In particular, the rectangular parameter is preferably set to 0.59 or more because the AW-EPMD-RF can be reduced by 10% or more from the worst value by setting. Furthermore, the rectangular parameter is preferably set to 0.71 or more because AW-EPMD-RF can be reduced by 20% or more from the worst value.

Third Embodiment

Next, a third embodiment will be described. In the first embodiment and the second embodiment, the cycle L of the twist waveform f(z) is fixed in the longitudinal direction, and within this fixed cycle the twist rotation angle in one direction and the twist rotation angle in the opposite direction are mutually balanced. The third embodiment shows that by varying the twist cycle L in the longitudinal direction, the expected EPMD-RF can be reduced and therefore the external PMD can be reduced more reliably even when the twist amplitude γ has an uncertainty. Here, the twist cycle L refers to a length within which the twist rotation angle in one direction and the twist rotation angle in the opposite direction are mutually balanced, so that the twist cycle L here is distinguished from the cycle of a periodic function in the mathematical meaning.

Figure 14:
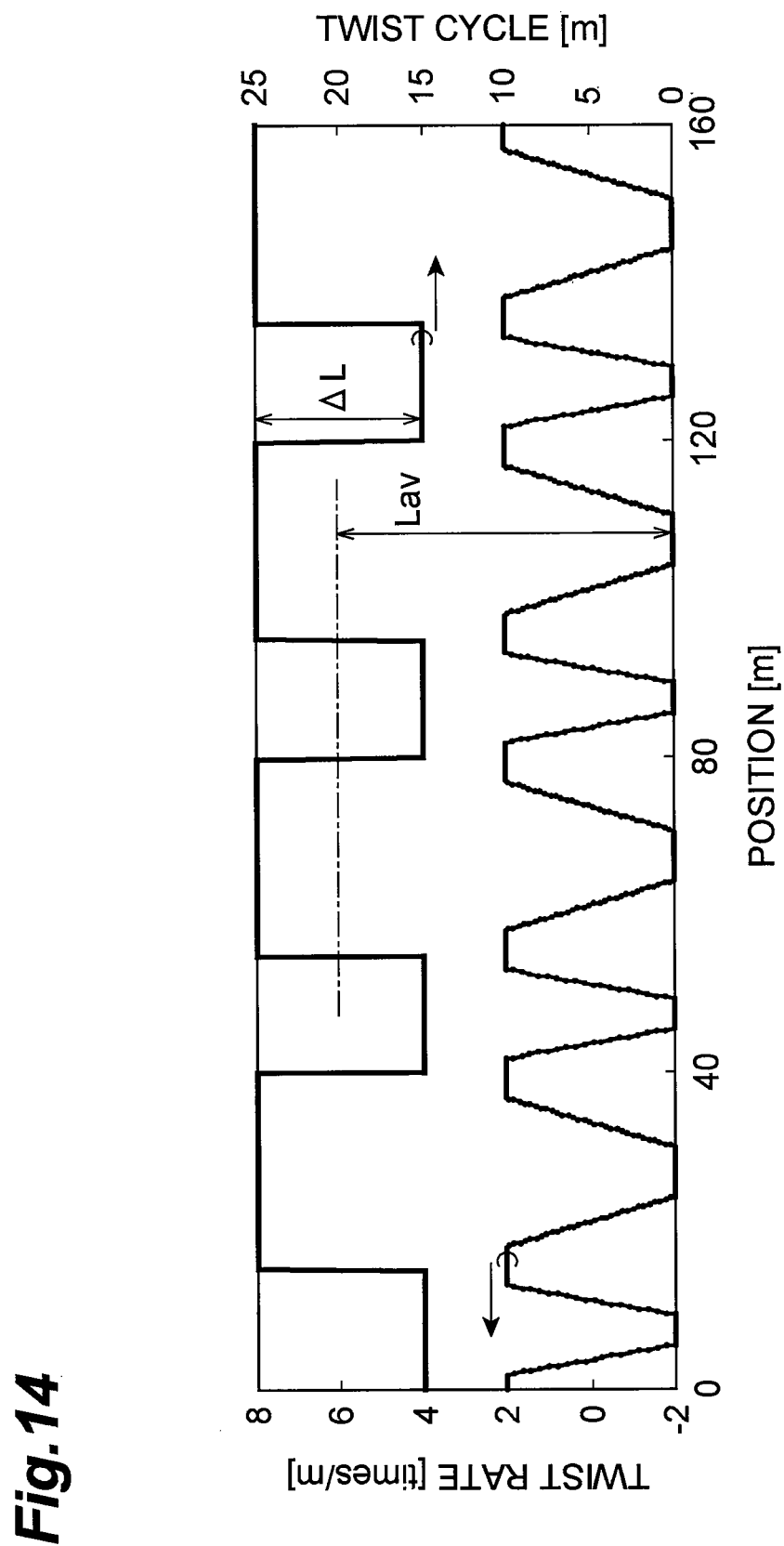
FIG. 14 is a view showing a twist waveform f(z) of a trapezoidal wave with a duty of 50% of Type 1 having a longitudinally-varying twist cycle.
Figure 15:
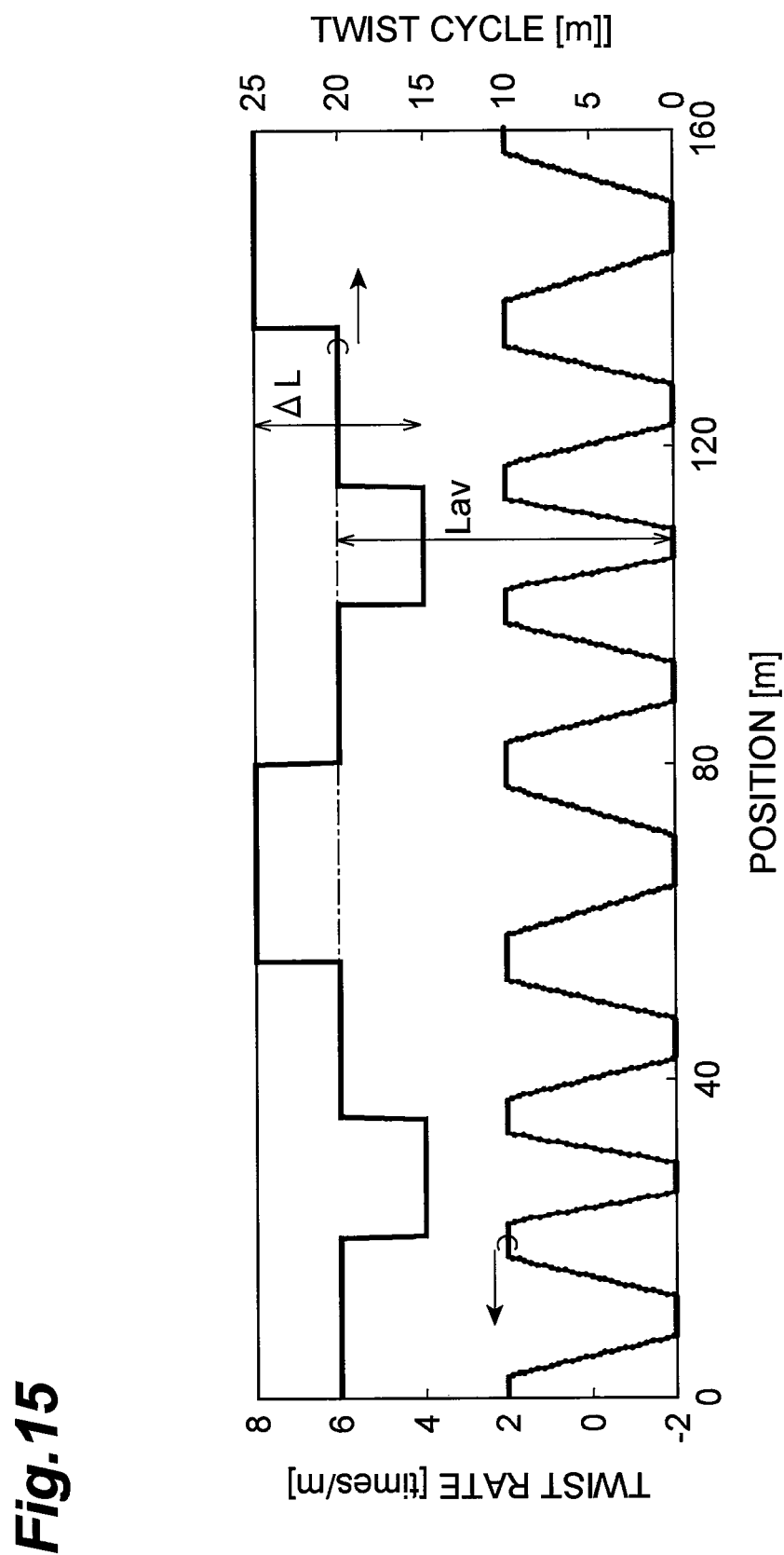
FIG. 15 is a view showing a twist waveform f(z) of a trapezoidal wave with a duty of 50% of Type 2 having a longitudinally-varying twist cycle.

Each of FIGS. 14 and 15 is a view showing the twist waveform f(z) of a trapezoidal wave with a duty of 50% having a longitudinally-varying twist cycle. In Type 1 shown in FIG. 14, the twist cycle varies over two levels. In Type 2 shown in FIG. 15, the twist cycle varies over three levels. Moreover, the variation width of the twist cycle is denoted by ΔL, the average value thereof is denoted by $L_{av}$, and the modulation factor m is defined by the following expression (45). Consequently, in the waveform of Type 1 (FIG. 14), the twist cycle varies alternately between two levels of $L_{av}(1-m)$ and $L_{av}(1+m)$. Moreover, in the waveform of Type 2 (FIG. 15), the twist cycle varies in the order of $L_{av}$, $L_{av}(1-M)$, $L_{av}$, and $L_{av}(1+m)$.

$$m = \Delta L / (2 L_{av}) \quad (45)$$

Figure 16:
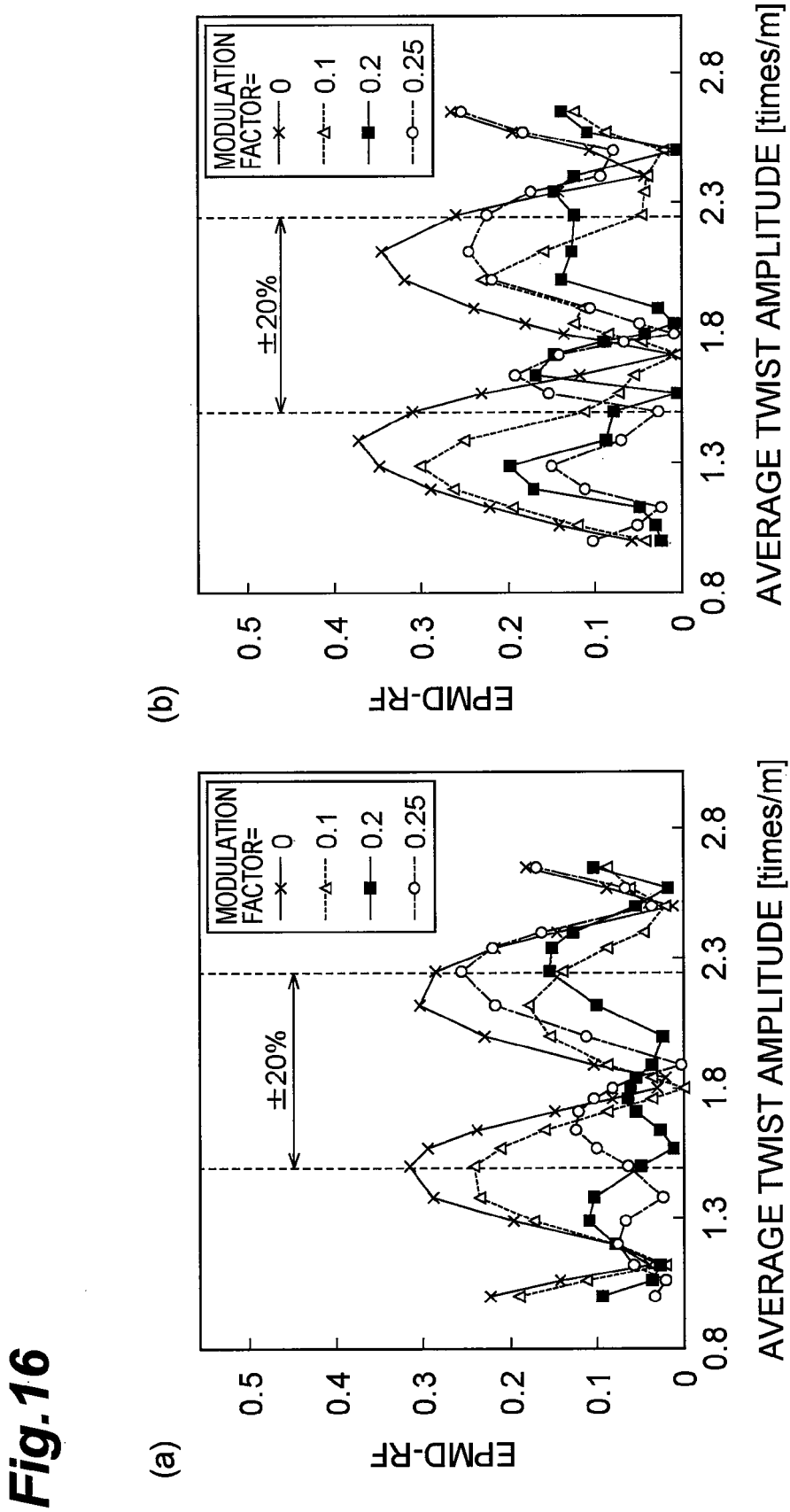
FIG. 16 shows views showing a twist amplitude dependence of EPMD-RF with respect to a modulation waveform of Type 1.
Figure 17:
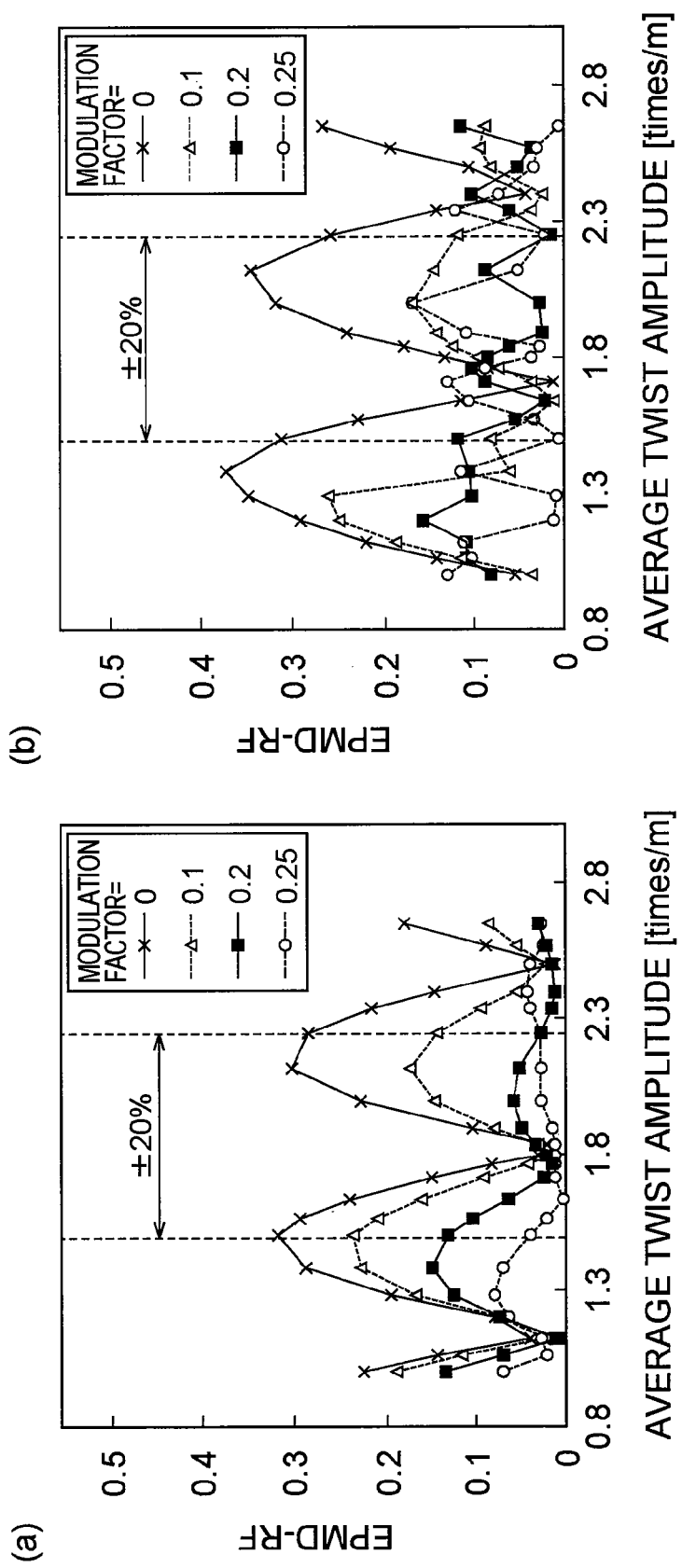
FIG. 17 shows views showing a twist amplitude dependence of EPMD-RF with respect to a modulation waveform of Type 2.

FIG. 16 shows views showing the twist amplitude dependence of EPMD-RF with regard to the modulation waveform of Type 1. FIG. 17 shows views showing the twist amplitude dependence of EPMD-RF with regard to the modulation waveform of Type 2. In each area (a) of FIGS. 16 and 17, the beat length $L_B$ of external birefringence is set to 155 m, while in each area (b) of FIGS. 16 and 17, the beat length $L_B$ of external birefringence is set to 15.5 m. Moreover, the modulation factor m is set to 0, 0.15, 0.25 and 0.35, respectively.

In each of FIGS. 16 and 17, when the modulation factor m is zero (i.e., when the average twist amplitude is approximately 1.8 times/m), EPMD-RF becomes minimum. This corresponds to the optimum twist condition of the above expressions (34a) and (34b). On the other hand, as the twist amplitude deviates from the optimum value, EPMD-RF will increase. On the other hand, as the modulation factor m is increased from zero, even when the twist amplitude deviates from the optimum value, the increase of EPMD-EF is smaller than when the modulation factor is zero. Namely, by using a mixture of a plurality of twist cycles, EPMD-RF can be kept low in a wider range of twist amplitudes. This tendency is the same regardless of the number of levels of twist cycle (regardless of Type 1 or 2) and the beat length $L_B$ (15.5 m or 155 m).

Figure 18:
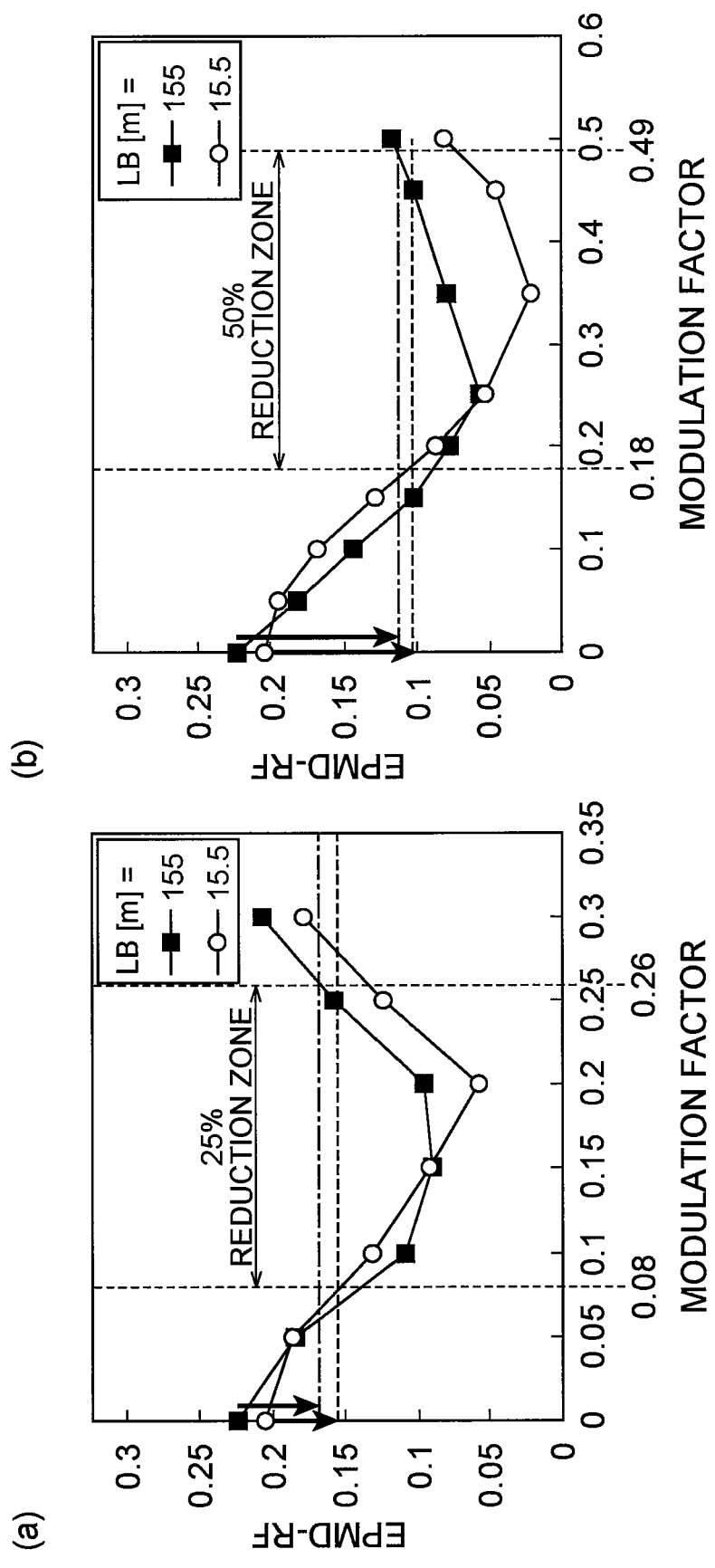
FIG. 18 shows views showing an expected value <EPMD-RF> of EPMD-RF when an average twist amplitude is a probability variable that may vary with a uniform probability in a range of ±20% around an optimum value.

FIG. 18 shows views showing the expected value of EPMD-RF when the average twist amplitude is a probability variable that may vary with a uniform probability in a range of ±20% around the optimum value. The area (a) of FIG. 18 shows the EPMD-RF for Type 1, and the area (b) of FIG. 18 shows the EPMD-RF for Type 2. As shown in FIG. 18, as the modulation factor m is increased from zero, the expected value of EPMD-RF will decrease. Namely, even when the twist amplitude has an uncertainty due to manufacturing variations, for example, or even when the twist amplitude varies, for example, in the rewinding step or in the cabling step after manufacturing, the external PMD can be reduced more reliably.

In particular, when the twist cycle is varied between two levels (Type 1), the modulation is preferably performed at a modulation factor in a range of 0.08 to 0.26 because the expected value of EPMD-RF will decrease by 25% or more as compared with a case where there is no modulation. Moreover, when the twist cycle is varied among three levels (Type 2), the modulation is performed preferably at a modulation factor in a range of 0.18 to 0.49 because the expected value of EPMD-RF will decrease by 50% or more as compared with the case where there is no modulation. Moreover, the twist cycle having three levels is more preferable than the twist cycle having two levels because the former can keep the expected value of EPMD-RF lower. Furthermore, as inferred also from the above results, the expected value of EPMD-RF may be further reduced by increasing the number of levels or by continuously varying the twist cycle.

In this way, when the twist rate is represented by TP(z) as a function of a longitudinal position z, the polarization mode dispersion (PMD) due to external birefringence can be reduced by setting the function TP(z) to a simple periodic function. However, this is not sufficient because PMD can be sufficiently reduced by controlling the amplitude of the function TP(z) to the optimum value but in reality such a control is difficult.

Then, hereinafter, a method is described, in which the PMD due to external birefringence is sufficiently reduced using a practically controllable parameter. In this method, modulation (amplitude modulation, frequency modulation) of the periodic function TP(z) is used. Here, it is shown that EPMD-RF (the above expression (22)) can be improved when a sine wave is used as the carrier and this sine wave is modulated.

First, consider a case where the function TP(z) is a frequency-modulated one with a sine wave as the carrier. Namely, consider a case where the following expressions (46) and (47) are satisfied. Here, when the function TP(z) is modulated with a triangular wave, the following expressions (48) to (51) are satisfied. Here, $L_L$ is the longest twist cycle, $L_S$ is the shortest twist cycle, $L_{fm}$ is a twist frequency (period) modulation cycle, and $γ_r$ is a twist amplitude. Moreover, TW(φ) is a triangular wave function that takes the amplitude of one at the period of 2π.

$$TP(z) = γ_r \sin θ(z) \quad (46)$$

$$θ(z) = 2π \int_0^z f(z) dz \quad (47)$$

$$f(z) = f_{av} + f_{dev} \cdot TW\left(2π \frac{z}{L_{fm}}\right) \quad (48)$$

$$TW(\phi) = \begin{cases} -2\phi/π + 1 & (0 \le \phi < π) \\ +2\phi/π - 3 & (π \le \phi < 2π) \end{cases} \quad (49a)$$

$$TW(\phi) = TW(\phi + 2πn) \quad (n: \text{integer}) \quad (49b)$$

$$f_{av} = \frac{1}{2}\left(\frac{1}{L_S} - \frac{1}{L_L}\right) \quad (50)$$

$$f_{dev} = \frac{1}{2}\left(\frac{1}{L_S} - \frac{1}{L_L}\right) \quad (51)$$

Figure 21:
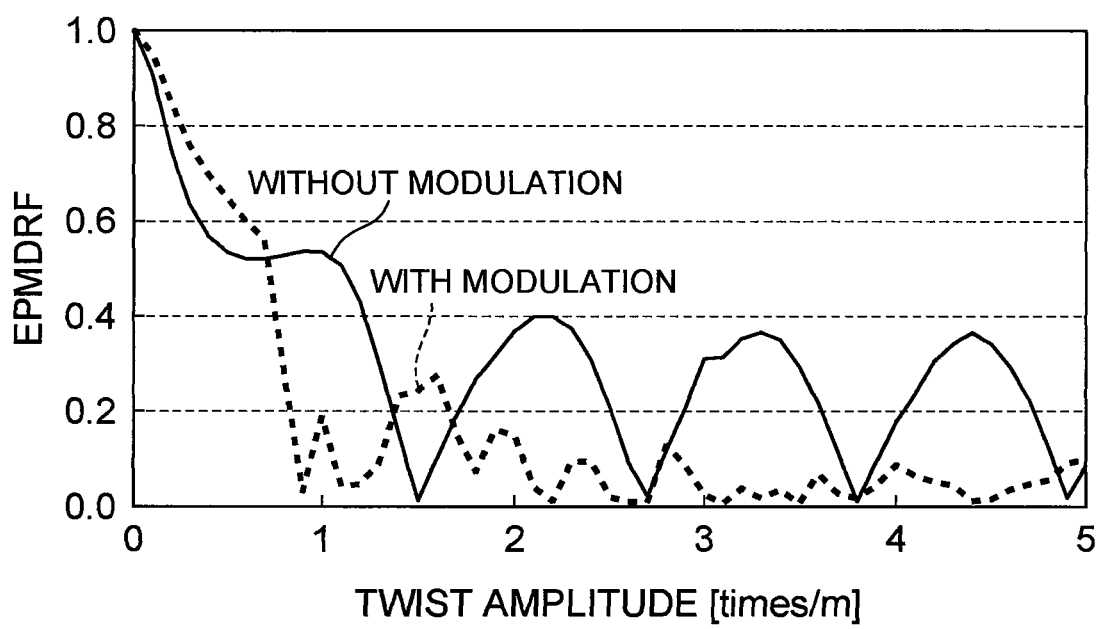
FIG. 21 shows a relationship between a twist amplitude $\gamma_r$ and EPMD-RF for each of the cases where the function TP(z) includes frequency modulation of a triangular wave and where it doesn't.

FIG. 21 shows a relationship between the twist amplitude $γ_r$ and EPMD-RF for each of the cases where the function TP(z) includes frequency modulation of a triangular wave and where it doesn't. The solid line in the view shows a simulation result in the case where there is no frequency modulation and both $L_S$ and $L_L$ set to 20 m. The dotted line in the view shows a simulation result in the case where there is the frequency modulation of a triangular wave and $L_{fm}$ is set to 100 m, $L_S$ to 20 m, and $L_L$ to 30 m. In this simulation, the external birefringence is set to $1 \times 10^{-7}$ and the glass birefringence is set to 0. It can be seen that in a range of the twist amplitude of two or more times/m, both the average value and maximum value of EPMD-RF in the case where there is the modulation are reduced significantly.

Figure 22:
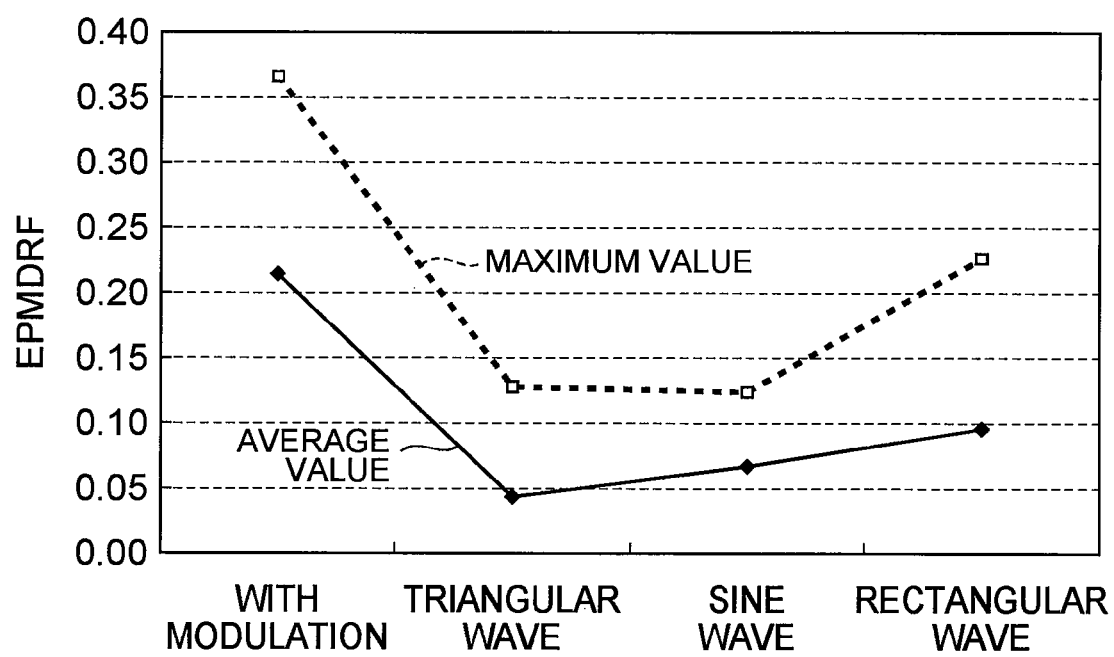
FIG. 22 is a view showing EPMD-RF in the case where the functions TP(z) includes various frequency modulations.

FIG. 22 is a view showing EPMD-RF when the function TP(z) includes various frequency modulations. Here, the frequency modulation waveforms are set to a sine wave and a rectangular wave in addition to a triangular wave. In any of the modulations, $L_{fm}$ is set to 100 m, $L_S$ to 20 m, and $L_L$ to 30 m. This view shows the average value and maximum value of EPMD-RF in the case where the twist amplitude is set to 2.5 to 5 times/m. EPMD-RF varies also depending on the waveforms, wherein EPMD-RF decreases in the order of a rectangular wave>a sine wave>a triangular wave.

Moreover, EPMD-RF also varies depending on the modulation cycle $L_{fm}$. Each of FIGS. 23 to 25 is a graph showing a relationship among $f_{fm}$, $f_{dev}$, and EPMD-RF. Here, $f_{fm}=1/L_{fm}$ and the modulation waveform is a triangular wave. FIG. 23 shows the case where $f_{av}$ is set to 0.05/m (the cycle is 20 m). FIG. 24 shows the case where $f_{av}$ is set to 0.033/m (the cycle is 30 m). FIG. 25 shows the case where $f_{av}$ is set to 0.025/m (the cycle is 40 m). The each area (a) of FIGS. 23 to 25 shows the average value of EPMD-RF in the case where the twist amplitude is set to 2.5 to 5 times/m. The each area (b) of FIGS. 23 to 25 shows the maximum value of EPMD-RF in the case where the twist amplitude is set to 2.5 to 5 times/m.

Although the respective graphs in FIGS. 23 to 25 show a tendency similar to each other, it can be seen that the absolute value of EPMD-RF for a larger $f_{av}$ becomes smaller. Since the fact that $f_{av}$ is large means that the twist cycle is small as a whole, the resistance against loosening due to rewinding becomes weak. Considering this, $f_{av}$ is preferably around 0.025 to 0.1. Of course, when rewinding is not required, a larger $f_{av}$ is preferable. Moreover, in order for EPMD-RF to become 0.1 or less on an average, $f_{dev}$ is preferably 0.0025/m or more. Furthermore, $f_{fm}$ should preferably not be a value close to $f_{av}$, $\frac{4}{5}f_{av}$, $\frac{2}{3}f_{av}$, $\frac{1}{2}f_{av}$, and $\frac{2}{5}f_{av}$. Furthermore, the relation ship $f_{fm} < \frac{1}{2}f_{av}$ is preferable. In the case of frequency modulation, although the absolute value of EPMD-RF differs also when the waveform is a sine wave or a rectangular wave, the graphs having a generally similar tendency are obtained.

Each of FIGS. 34 and 35 is a graph showing a relationship among $L_{fm}$, $L_L$, and EPMD-RF. FIG. 34 shows the case where $L_S$ is set to 20 m. FIG. 35 shows the case where $L_S$ is set to 15 m. The each area (a) of FIGS. 34 and 35 shows the average value of EPMD-RF in the case where the twist amplitude is set to 2.5 to 5 times/m. The each area (b) of FIGS. 34 and 35 shows the average value of EPMD-RF in the case where the twist amplitude is set to 2.5 to 5 times/m. When $L_S$ is approximately 20 m, at least the relationships 32 m$\leq L_L \leq$52 m and $L_{fm} \leq 55/3 \cdot L_L\_500$ (i.e., corresponds to a region having a larger $L_{fm}$ of regions separated by a straight line passing through two points (30, 50) and (60, 600) in ($L_L$, $L_{fm}$)) are preferable as the range for EPMD-RF to become generally 0.04 or less in the area (a) of FIG. 34. Alternatively, it may be expressed that the relationships 12$\leq L_L-L_S \leq$32 and $L_{fm} \geq \{55(L_L-L_S)-400\}/3$ are preferable. When $L_S$ is approximately 15 m, at least the relationships 25 m$\leq L_L \leq$58 m and $L_{fm} \geq$100 are preferable as the range for EPMD-RF to become generally 0.04 or less in the area (a) of FIG. 35. Alternatively, it may be expressed that the relationships 10$\leq L_L-L_S \leq$43 and $L_{fm} \geq$100 are preferable.

Figure 26:
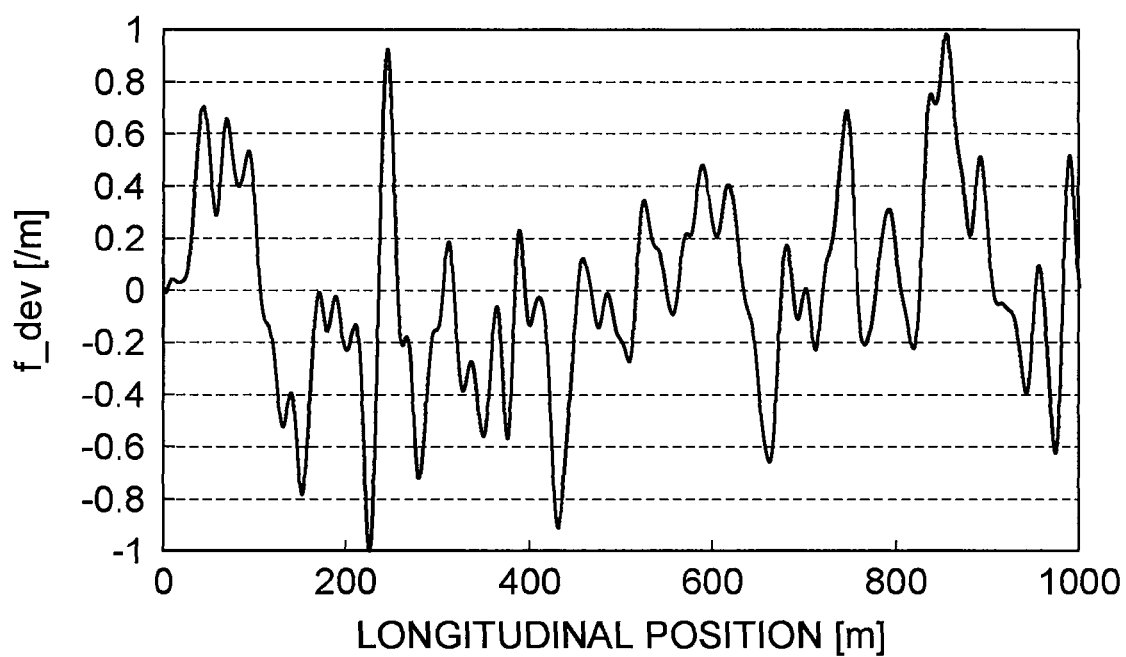
FIG. 26 is a view showing a random frequency modulation waveform in the function TP(z)
Figure 27:
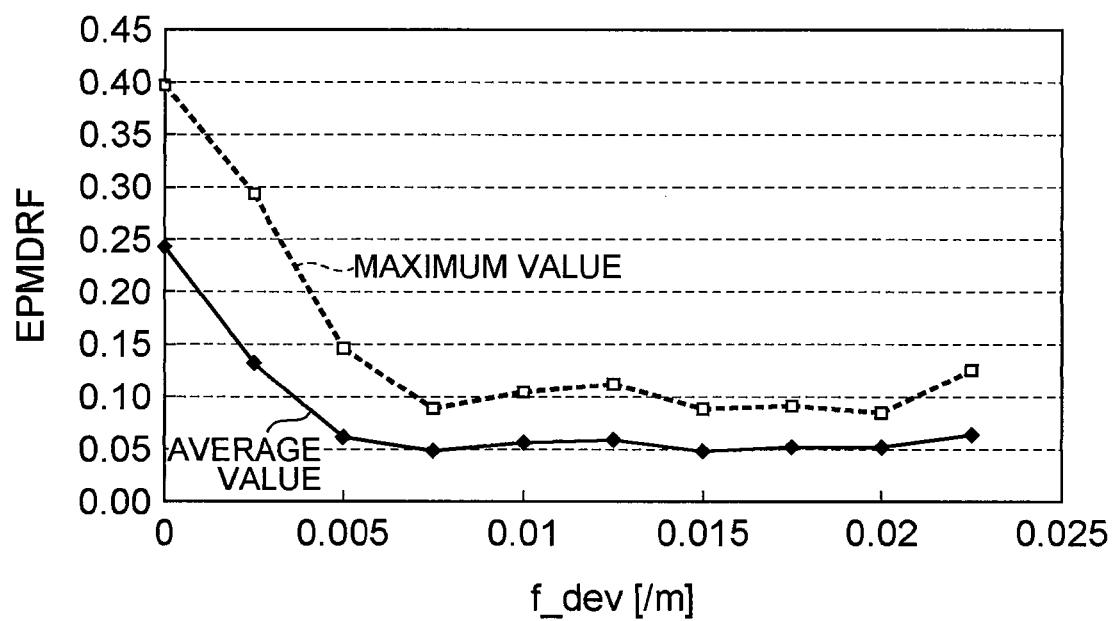
FIG. 27 is a view showing a relationship between $f_{dev}$ and EPMD-RF when the function TP(z) includes the random frequency modulation of FIG. 26.

So far, we have considered the cases where periodic functions, such as a sine wave, a triangular wave, and a rectangular wave, are used as the modulation waveform. Now, a case where a random waveform is used as the modulation waveform will be described. FIG. 26 is a view showing a random frequency modulation waveform in the function TP(z). FIG. 27 is a view showing a relationship between $f_{dev}$ and EPMD-RF when the function TP(z) includes the random frequency modulationmodulation of FIG. 26. This view shows the average value and maximum value of EPMD-RF when the twist amplitude is set to 2.5 to 5 times/m. It can be seen that even when the modulation waveform is random, EPMD-RF may be significantly reduced as compared with the case where there is no modulation.

In this way, by applying an appropriate frequency modulation to the function TP(z), i.e., applying an appropriate modulation to the cycle of the function TP(z), EPMD-RF can be reduced significantly.

Next, consider a case where the function TP(z) is an amplitude-modulated one with a sine wave as the carrier. At this time, the following expression (52) is satisfied. A(z) is a function with the amplitude of one, where $L_p$ is the twist cycle. $\gamma_{max}$ is the maximum twist amplitude and represented by the following expression (53). Here, again, considering a case where the function TP(z) is modulated with a triangular wave, the following expression (54) is satisfied, where $L_{am}$ is the amplitude modulation cycle of a twist. Moreover, the modulation factor $m_d$ is defined as the following expression (55).

$$TP(z) = \{\gamma_s A(z) + \gamma_c\}\sin\left(2\pi\frac{z}{L_p}\right) \tag{52}$$

$$\gamma_{max} = \gamma_s + \gamma_c \tag{53}$$

$$A(z) = TW\left(2\pi\frac{z}{L_{am}}\right) \tag{54}$$

$$m = \frac{\gamma_s}{\gamma_c} \tag{55}$$

Figure 28:
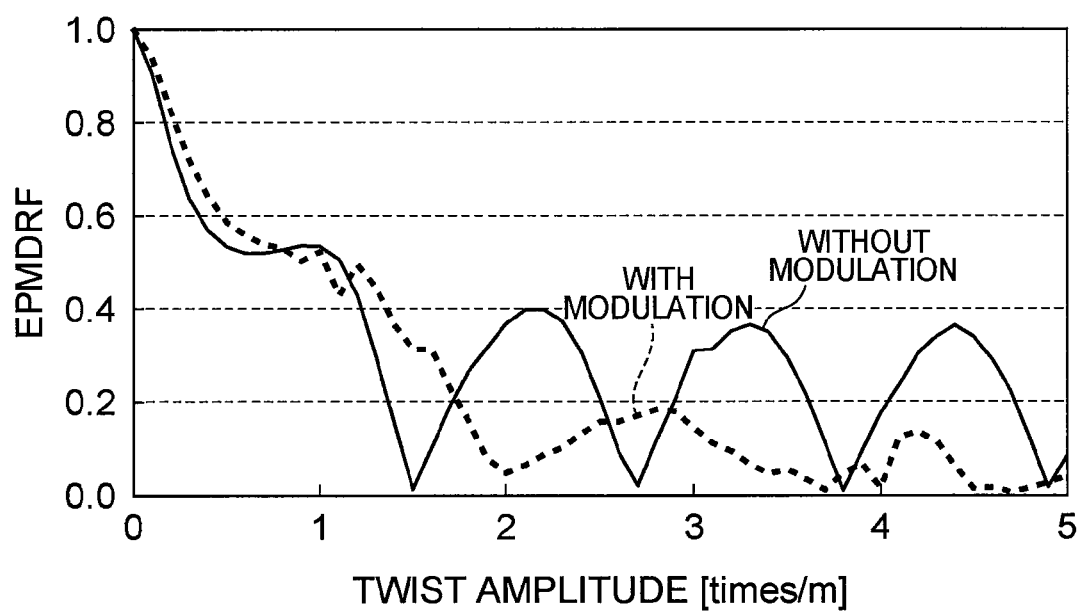
FIG. 28 is a view showing a relationship between the twist amplitude $\gamma_r$ and EPMD-RF for each of the cases where the function TP(z) includes the amplitude modulation of a triangular wave and where it doesn't.

FIG. 28 is a view showing a relationship between the twist amplitude $\gamma_r$ and EPMD-RF for each of the cases where the function TP(z) includes the amplitude modulation of a triangular wave and where it doesn't. The solid line in the view shows a simulation result in the case where there is no amplitude modulation. The dotted line in the view shows a simulation result in the case where there is the amplitude modulation of a triangular wave and $L_p$ is set to 20 m, $L_{am}$ to 100 m, and $m_d$ to 0.25/0.75. It can be seen that in a range of the twist amplitude of two or more times/m, both the average value and the maximum value of EPMD-RF are significantly reduced when there is the amplitude modulation.

Also in the amplitude modulation, EPMD-RF is affected by $m_d$ and $L_{am}$. Each of FIGS. 29 to 31 is a graph showing a relationship among $m_d$, $L_{am}$, and EPMD-RF. FIG. 29 shows the case where the modulation waveform is a triangular wave ($L_p$=20 m). FIG. 30 shows the case where the modulation waveform is a sine wave ($L_p$=20 m). FIG. 31 shows the case where the modulation waveform is a rectangular wave ($L_p$=20 m). The each area (a) of FIGS. 29, 30 and 31 shows the average value of EPMD-RF when the twist amplitude is set to 2.5 to 5 times/m. The each area (b) of FIGS. 29, 30 and 31 shows the average value of EPMD-RF when the twist amplitude is set to 2.5 to 5 times/m.

It can be seen that each of the graphs has a tendency generally similar to each other except the case of the rectangular wave of FIG. 31. At this time, in order for EPMD-RF to become 0.1 or less on an average, the modulation waveform is preferably a periodic function other than the rectangular wave, where $m_d$ is 0.2 or more and $L_{am}$ is 120 $m_d$ or more. It can be seen that when the modulation waveform is a rectangular wave, the range of parameters where EPMD-RF is significantly reduced is narrow.

Figure 32:
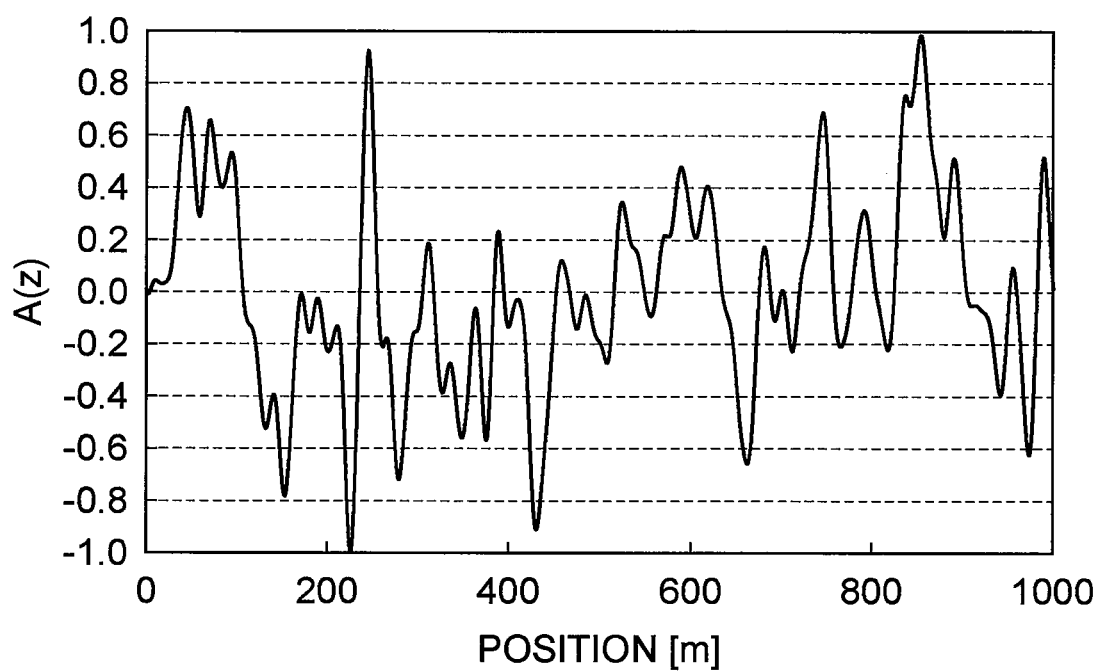
FIG. 32 is a view showing a random amplitude modulation waveform in the function TP(z)
Figure 33:
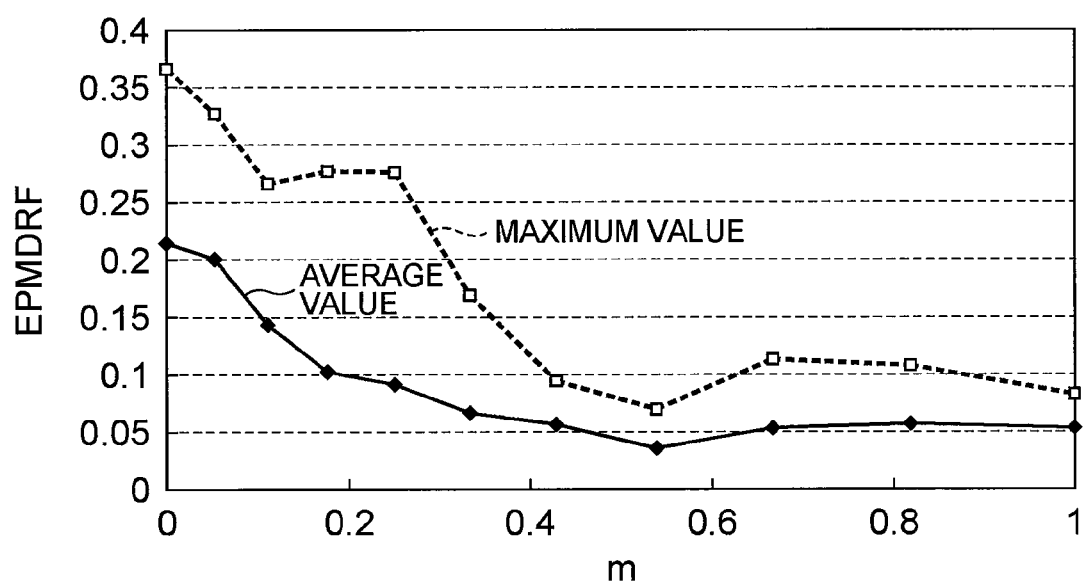
FIG. 33 is a view showing a relationship between m and EPMD-RF when the function TP(z) includes the random amplitude modulation of FIG. 32.

So far, we have considered the cases where periodic functions, such as a sine wave, a triangular wave, and a rectangular wave, are used as the modulation waveform. Now, a case where a random waveform is used as the modulation waveform will be described. FIG. 32 is a view showing a random amplitude modulation waveform in the function TP(z). FIG. 33 is a view showing a relationship between $m_d$ and EPMD-RF when the function TP(z) includes the random amplitude modulation of FIG. 32. This view shows the average value and maximum value of EPMD-RF when the twist amplitude is set to 2.5 to 5 times/m. It can be seen that even when the modulation waveform is random, EPMD-RF may be significantly reduced as compared with the case where there is no modulation.

In this way, by applying an appropriate amplitude modulation to the function TP(z), EPMD-RF can be reduced significantly.

Note that the function TP(z) may be a frequency-modulated as well as amplitude-modulated one with a sine wave as the carrier.

The invention claimed is:

1. An optical fiber imparted with a twist, which is an elastic torsion with stress,
   wherein a twist rate, which is the number of rotations per unit length by the twist, is represented by f(z) as a function of a position z in a longitudinal direction of the optical fiber, the f(z) having a predetermined twist cycle and being defined such that a twist rotation angle in one direction and a twist rotation angle in the opposite direction become equal to each other in the twist cycle, and
   wherein, when a proportionality coefficient representing circular birefringence per twist rate is denoted by g, an angular frequency is denoted by ω, external linear birefringence due to a bending and a lateral pressure is denoted by $β_e$, and relational expressions (1a) to (1f) are satisfied, a twist condition for the optical fiber satisfies a first condition that a twist error amount A defined by a relational expression (1g) with a twist cycle denoted by L is 8π (rad) or less $$k=1,2,3,\ldots \tag{1a}$$

$\hat{q}_k(\rho)$: k-th zero point x from the smallest one among $$\left\{F(x) = \frac{gx}{4} + \left(\frac{d_e}{d_t\rho^4 + 0.42_e(1-\rho^4)} - 1\right)\tan\frac{gx}{4}(x>0)\right\} \tag{1b}$$

$$d_e = \frac{\omega}{\beta_e}\frac{\partial \beta_e}{\partial \omega} \tag{1c}$$

$$d_t = \frac{\omega}{g}\frac{\partial g}{\partial \omega} \tag{1d}$$

$$\gamma_{av} = \langle|f(z)|\rangle = \frac{1}{L}\oint|f(z)|dz \tag{1e}$$

$$\rho = \langle|f(z)|\rangle / \max|f(z)| \tag{1f}$$

$$A = \frac{\min}{k}|\gamma_{av}L - \hat{q}_k(\rho)/1.014| \tag{1g}$$

$$L_{opt} = |L - \hat{q}_k(\rho)/(1.014\gamma_{av})| \tag{1h}$$

2. An optical fiber according to claim 1, wherein the twist condition for the optical fiber satisfies a second condition that the twist cycle varies in the longitudinal direction of the optical fiber across an optimum cycle $L_{opt}$ defined by a relational expression (1h).

3. An optical fiber according to claim 1, wherein a rectangular parameter ρ defined by the relational expression (1f) under the first condition is 0.59 or more.

4. An optical fiber according to claim 1, wherein, when the first condition is satisfied and a twist threshold value given by a ratio ($β_e$/g) is denoted by $γ_{th}$, then an average twist rate $γ_{av}$ defined by the relational expression (1e) is $2γ_{th}$ or more.

5. An optical fiber according to claim 1, wherein, when a bending diameter is denoted by D, a photoelastic constant is denoted by ΔC, Young's modulus is denoted by E, a glass diameter is denoted by d, a light wavelength is denoted by λ, and a twist threshold value defined as a ratio ($β_e$/g) using linear birefringence $β_e$ given by a following relational expression (2) is denoted by $γ_{th}$, then the average twist rate $γ_{av}$ defined by the relational expression (1e) in a state where the optical fiber is wound in a coil shape is $2γ_{th}$ or more $$\beta_e = \frac{\pi\Delta CE}{\lambda}\left(\frac{d}{D}\right)^2. \tag{2}$$

6. An optical fiber imparted with a twist, which is an elastic torsion with stress,
   wherein a twist rate, which is the number of rotations per unit length by the twist, is represented by f(z) as a function of a position z in a longitudinal direction of the optical fiber, the f(z) having a predetermined twist cycle and being defined such that a twist rotation angle in one direction and a twist rotation angle in the opposite direction are equal to each other in the twist cycle, and
   wherein, when a proportionality coefficient representing circular birefringence per twist rate is denoted by g, an angular frequency is denoted by ω, external linear birefringence due to a bending and a lateral pressure is denoted by $β_e$, and relational expressions (3a) to (3f) are satisfied, a twist condition for the optical fiber satisfies a second condition that the twist cycle varies in a longitudinal direction of the optical fiber across an optimum cycle $L_{opt}$ defined by the relational expression (3h)

$$k=1,2,3,\ldots \tag{3a}$$

$\hat{q}_k(\rho)$: k-th zero point x from the smallest one among $$\left\{F(x) = \frac{gx}{4} + \left(\frac{d_e}{d_t\rho^4 + 0.42d_e(1-\rho^4)} - 1\right)\tan\frac{gx}{4}(x>0)\right\} \tag{3b}$$

$$d_e = \frac{\omega}{\beta_e}\frac{\partial \beta_e}{\partial \omega} \tag{3c}$$

-continued $$d_t = \frac{\omega}{g}\frac{\partial g}{\partial \omega} \quad (3d)$$

$$\gamma_{av} = \langle |f(z)|\rangle = \frac{1}{L}\oint |f(z)|dz \quad (3e)$$

$$\rho = \langle |f(z)|\rangle / \max|f(z)| \quad (3f)$$

$$A = \min_k |\gamma_{av}L - \hat{q}_k(\rho)/1.014| \quad (3g)$$

$$L_{opt} = |L - \hat{q}_k(\rho)/(1.014\gamma_{av})| \quad (3h).$$

7. An optical fiber according to claim 6, wherein, when a bending diameter is denoted by D, a photoelastic constant is denoted by $\Delta C$, Young's modulus is denoted by E, a glass diameter is denoted by d, a light wavelength is denoted by $\lambda$, and a twist threshold value defined by a ratio ($\beta_e/g$) using linear birefringence $\beta_e$ given by the following relational expression (4) is denoted by $\gamma_{th}$, then the average twist rate $\gamma_{av}$ defined by the relational expression (3e) in a state where the optical fiber is wound in a coil shape is $2\gamma_{th}$ or more $$\beta_e = \frac{\pi\Delta CE}{\lambda}\left(\frac{d}{D}\right)^2. \quad (4)$$

* * * * *